(12) United States Patent
Balsan et al.

(10) Patent No.: US 8,346,210 B2
(45) Date of Patent: Jan. 1, 2013

(54) METHOD AND APPARATUS FOR MANAGING SERVICES USING BEARER TAGS

(75) Inventors: Damien Balsan, Belmont, MA (US); Ajay Bam, Cambridge, MA (US)

(73) Assignee: Nokia Corporation, Espoo (FI)

( * ) Notice: Subject to any disclaimer, the term of this patent is extended or adjusted under 35 U.S.C. 154(b) by 632 days.

(21) Appl. No.: 12/395,512

(22) Filed: Feb. 27, 2009

(65) Prior Publication Data
US 2010/0222021 A1    Sep. 2, 2010

(51) Int. Cl.
  *H04M 11/00*    (2006.01)
  *H04M 1/00*    (2006.01)
  *H04Q 5/22*    (2006.01)
  *H04B 5/00*    (2006.01)

(52) U.S. Cl. .................. 455/406; 455/418; 455/426.1; 455/41.1

(58) Field of Classification Search ............... 455/406, 455/418, 426.1, 41.1; 340/7.1; 705/26.1
See application file for complete search history.

(56) References Cited

U.S. PATENT DOCUMENTS

| | | | |
|---|---|---|---|
| 5,915,226 | A | 6/1999 | Martineau |
| 6,205,327 | B1 | 3/2001 | Sentinelli |
| 6,557,753 | B1 | 5/2003 | Beaujard et al. |
| 7,016,311 | B2 | 3/2006 | Tiernay et al. |
| 7,185,809 | B2 | 3/2007 | Barton et al. |
| 7,417,546 | B2 | 8/2008 | Llorca et al. |
| 7,441,706 | B1 | 10/2008 | Schuessler et al. |
| 7,519,325 | B2 | 4/2009 | Wakim |
| 7,545,271 | B2 | 6/2009 | Jalkanen et al. |
| 2002/0133545 | A1 | 9/2002 | Fano et al. |
| 2002/0194075 | A1 | 12/2002 | O'Hagan et al. |
| 2003/0055667 | A1 | 3/2003 | Sgambaro et al. |
| 2003/0120745 | A1 | 6/2003 | Katagishi et al. |
| 2003/0135463 | A1 | 7/2003 | Brown et al. |
| 2004/0002305 | A1 | 1/2004 | Byman-Kivivuori et al. |
| 2004/0166807 | A1 | 8/2004 | Vesikivi et al. |
| 2004/0176032 | A1 | 9/2004 | Kotola et al. |
| 2005/0216344 | A1 | 9/2005 | Collet et al. |
| 2006/0220838 | A1 | 10/2006 | Wakim et al. |
| 2006/0293085 | A1 | 12/2006 | Lauper |
| 2007/0022012 | A1 | 1/2007 | Wu et al. |

(Continued)

FOREIGN PATENT DOCUMENTS

EP    1 719 039    11/2006

(Continued)

OTHER PUBLICATIONS

Office action for related U.S. Appl. No. 11/597,863 (P3453US00) dated Nov. 29, 2010, pp. 1-16.

(Continued)

*Primary Examiner* — Jinsong Hu
*Assistant Examiner* — Jean Chang
(74) *Attorney, Agent, or Firm* — Ditthavong Mori & Steiner, P.C.

(57) ABSTRACT

An approach is provided for managing one or more services corresponding to a bearer tag (e.g., near field communication (NFC) tag, radio frequency identification (RFID) tag, contactless card, or barcode). A request to manage a service is initiated by reading service information from a bearer tag corresponding to the one or more services. A services platform initiates management of the one or more services based on the service information according to a predetermined or recurring billing arrangement.

17 Claims, 20 Drawing Sheets

U.S. PATENT DOCUMENTS

| | | | |
|---|---|---|---|
| 2007/0205874 A1 | 9/2007 | Tokkonen et al. | |
| 2007/0257774 A1* | 11/2007 | Stumpert et al. | 340/7.1 |
| 2007/0270158 A1 | 11/2007 | Bi et al. | |
| 2008/0103984 A1 | 5/2008 | Choe et al. | |
| 2008/0215442 A1 | 9/2008 | McGary et al. | |
| 2008/0238610 A1* | 10/2008 | Rosenberg | 340/5.7 |
| 2008/0278286 A1 | 11/2008 | Takaluoma et al. | |
| 2008/0306828 A1 | 12/2008 | Chao | |
| 2009/0006261 A1 | 1/2009 | Bernstein et al. | |
| 2009/0023474 A1 | 1/2009 | Luo et al. | |
| 2009/0192912 A1* | 7/2009 | Griffin et al. | 705/26 |
| 2009/0234472 A1 | 9/2009 | Pyle | |
| 2010/0075666 A1* | 3/2010 | Garner | 455/426.1 |
| 2010/0082485 A1 | 4/2010 | Lin et al. | |
| 2010/0114775 A1 | 5/2010 | Griffin | |
| 2010/0216396 A1* | 8/2010 | Fernandez et al. | 455/41.1 |
| 2010/0222021 A1 | 9/2010 | Balsan et al. | |

FOREIGN PATENT DOCUMENTS

| | | |
|---|---|---|
| EP | 2 063 375 A1 | 5/2009 |
| EP | 2 076 892 | 7/2009 |
| EP | 2 131 317 A1 | 12/2009 |
| GB | 2 430 524 A | 3/2007 |
| TW | 200627317 | 8/2006 |
| WO | 0122325 A1 | 3/2001 |
| WO | WO 2004/061734 A1 | 7/2004 |
| WO | WO 2005/081088 A1 | 9/2005 |
| WO | 2005098768 A1 | 10/2005 |
| WO | 2006006767 A1 | 1/2006 |
| WO | WO 2006/035315 A1 | 4/2006 |
| WO | WO 2008/051598 A2 | 5/2008 |
| WO | WO 2008/060242 A1 | 5/2008 |
| WO | WO 2008/087431 A1 | 7/2008 |
| WO | WO 2008/147109 A2 | 12/2008 |
| WO | WO 2009/030023 A1 | 3/2009 |
| WO | WO 2009/141764 A2 | 11/2009 |

OTHER PUBLICATIONS

Office action for related U.S. Appl. No. 12/471,315 (P2564US00) dated Feb. 14, 2011, pp. 1-7.

Controlling multimedia players using NFC enabled mobile phones, Sanchez et al., Proc. of the 6th Int. Conf. on Mobile and ubiquitous multimedia, Mobile and Ubiquitous Multimedia, vol. 284, 2007, pp. 118-124.

International Search Report and Written Opinion for corresponding International App. No. PCT/FI2010/050125 dated May 25, 2010, pp. 1-20.

NFC mobile phone demo: A few smooth, convenient features . . . and not so smooth, Haddad, Apr. 13, 2007, pp. 1-5. Accessed: May 11, 2010, http://aneace.blogspot.com/2007/04/nfc-mobile-phone-demo-few-smooth.html.

Nokia Presents 3G NFC Capable Mobile Phone, Colby, Apr. 15, 2008, pp. 1-2. Accessed: May 11, 2010, http://news.soft32.com/nokia-presents-3g-nfc-capable-mobile-phone_6316.html.

Towards an RFID-Oriented Service Discovery System, Jin et al., UIC 2007, LNCS 4611, Springer-Verlag, 2007, pp. 235-245.

"RFID and Smart Spaces"; Jukka Riekki; vol. 2; on pp. 143-152; Publication date: 2007; (http://inderscience.metapress.com/app/home/contribution.asp?referrer=parent
&backto=issue,1,11;journal,6,12;
linkingpublicationresults,1:119744,1).

"Requesting Pervasive Services by Touching RFID Tags"; Jukka Riekki, Timo Salminen, Ismo Alakärppä; (http://www.mediateam.oulu.fi/publications/pdf/1008.pdf).

Bo, L., Tan, T.: A DRM System Implementing RFID to Protect AV Content (Abstract). IEEE Tenth International Symposium on Consumer Electronics, Posted Online; Sep. 11, 2006, http://ieeexplore.ieee.org/xpl/freeabs_all.jsp?arnumber=1689456.

Suh, J., Park, S.: u-DRM: A Unified Framework of Digital Rights Management based on RFID and Application of Its Usage Data. International Journal of Computer Science and Network Security, vol. 6, Aug. 2006, paper.ijcsns.org/07_book/200608/200608C09.pdf.

International Search Report and Written Opinion for corresponding PCT Application No. PCT/FI2010/050359, Aug. 19, 2010, pp. 1-13.

Office action for related U.S. Appl. No. 12/471,315 (P2564US00) dated Aug. 8, 2011, pp. 1-16.

Office action for related U.S. Appl. No. 11/597,863 (P3453US00) dated Apr. 20, 2011, pp. 1-15.

Office Action for related U.S. Appl. No. 12/471,315 dated Nov. 10, 2011, pp. 1-14.

Final Rejection for related U.S. Appl. No. 12/471,315 dated Jun. 21, 2012, pp. 1-20.

* cited by examiner

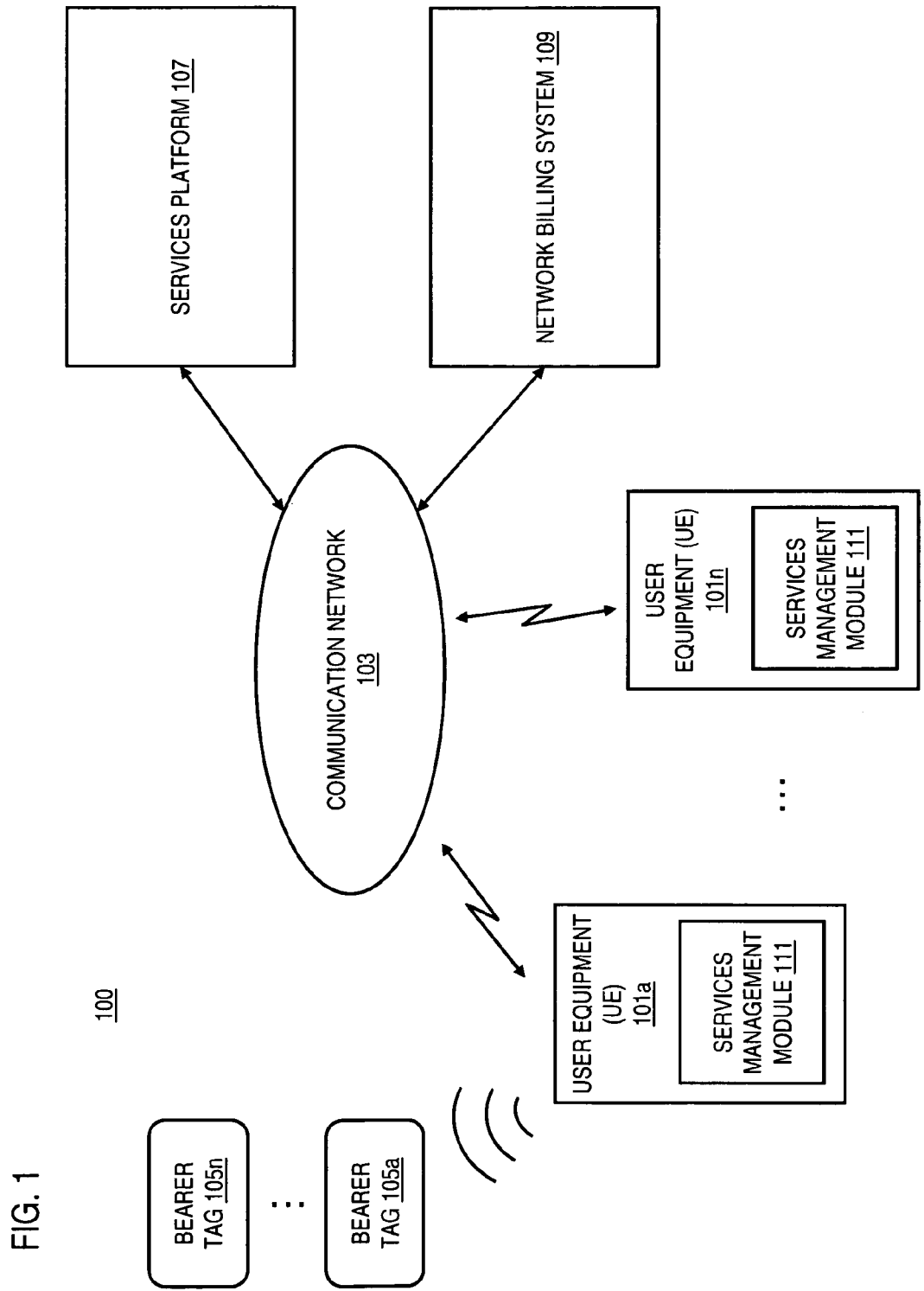

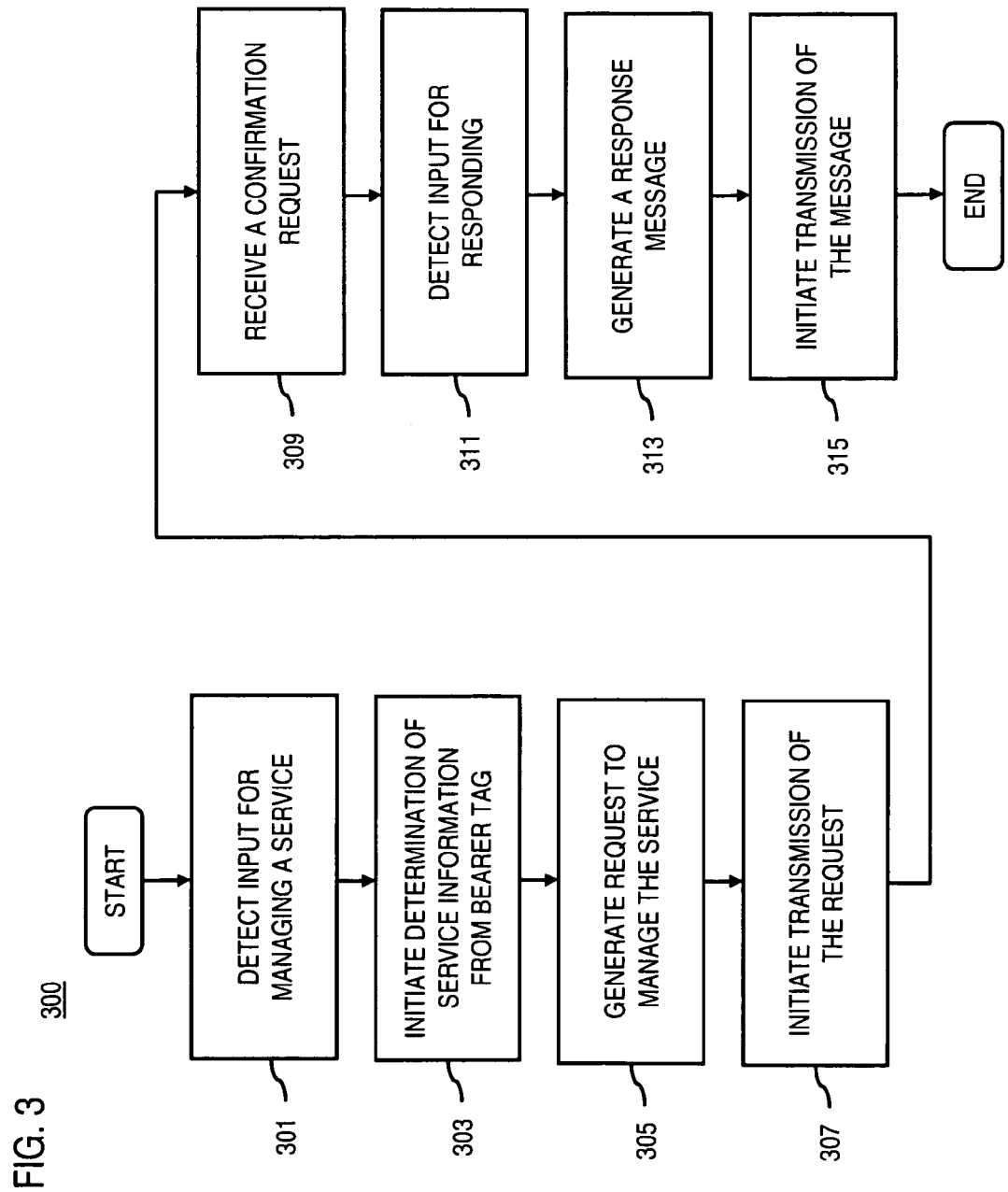

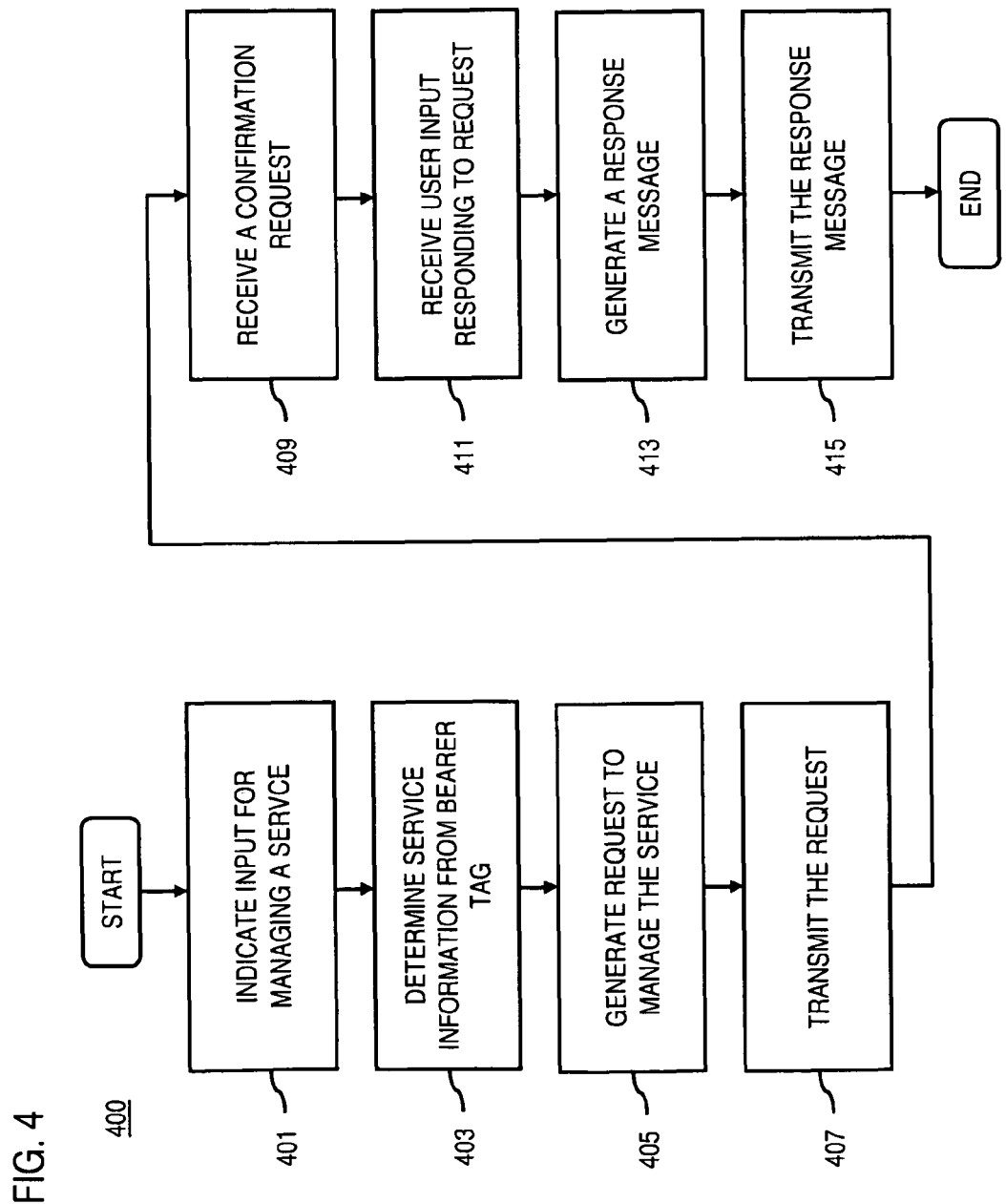

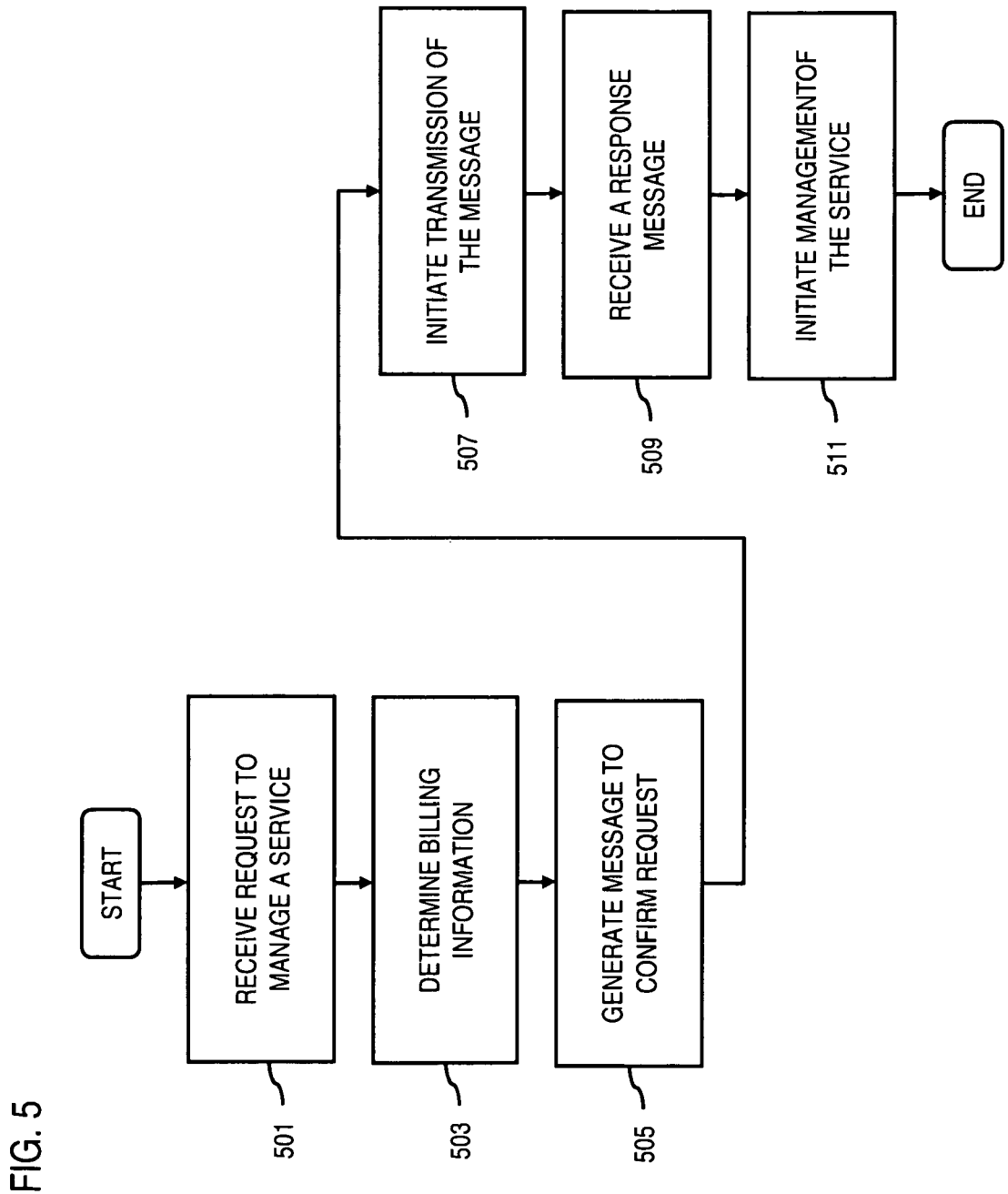

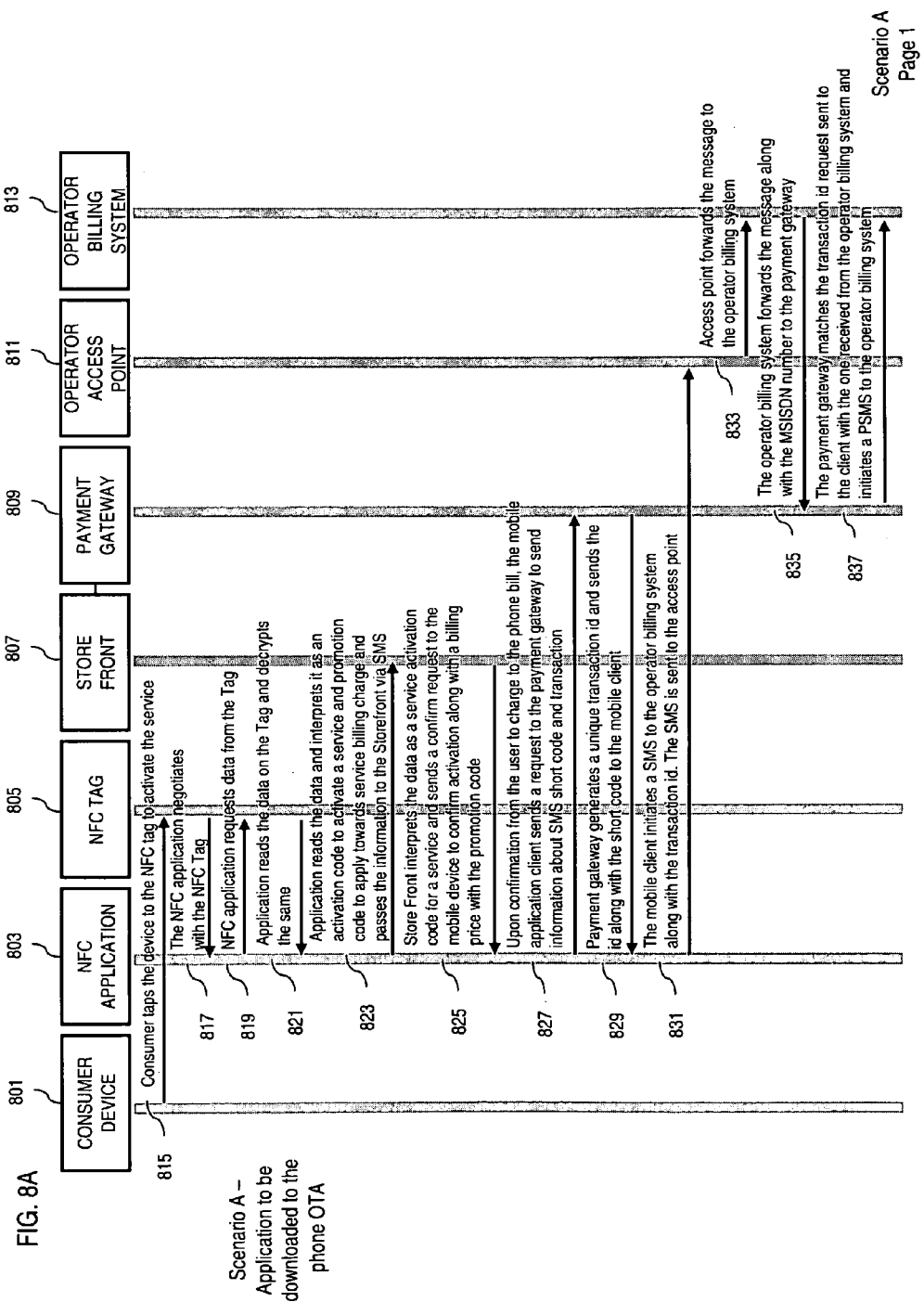

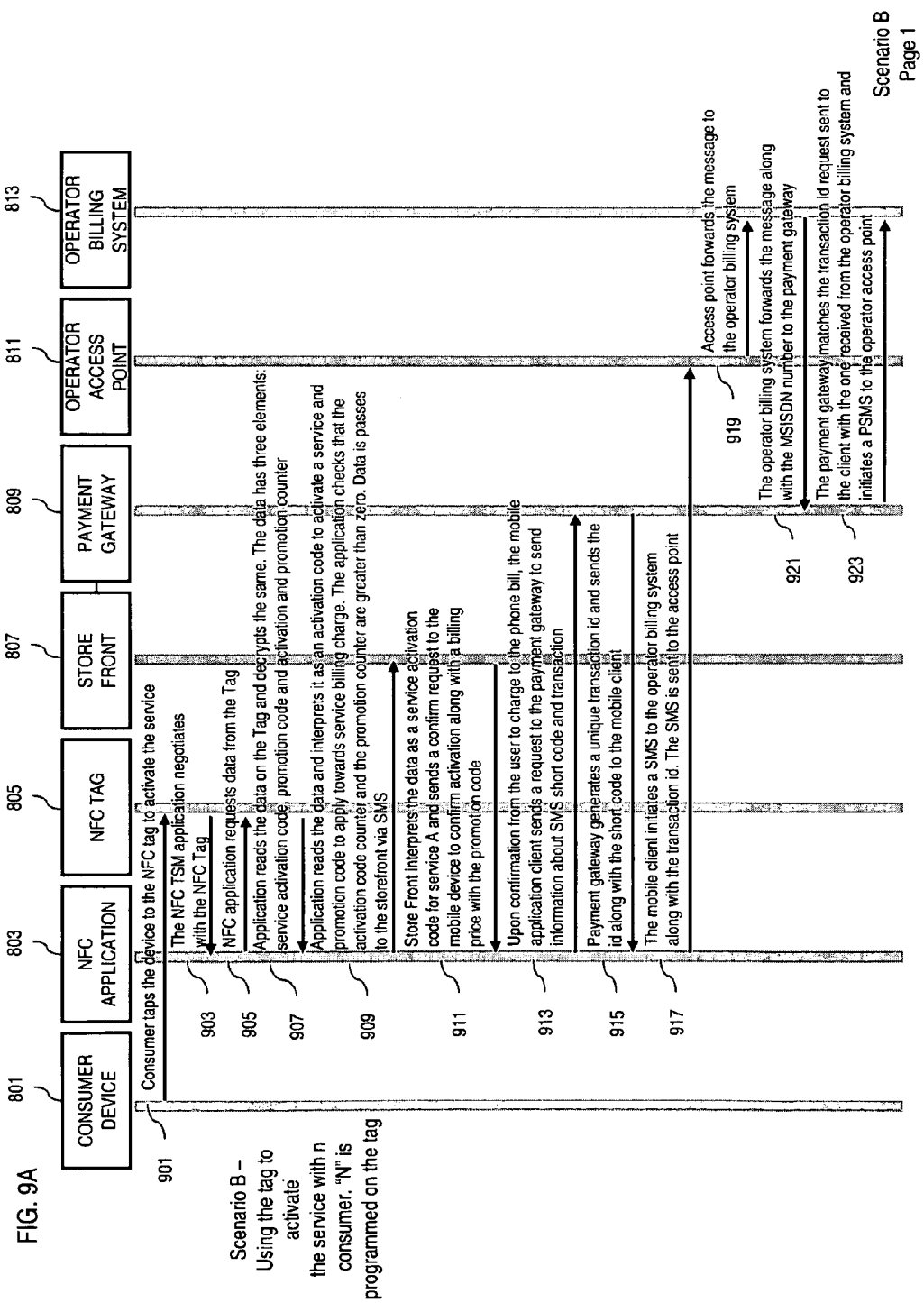

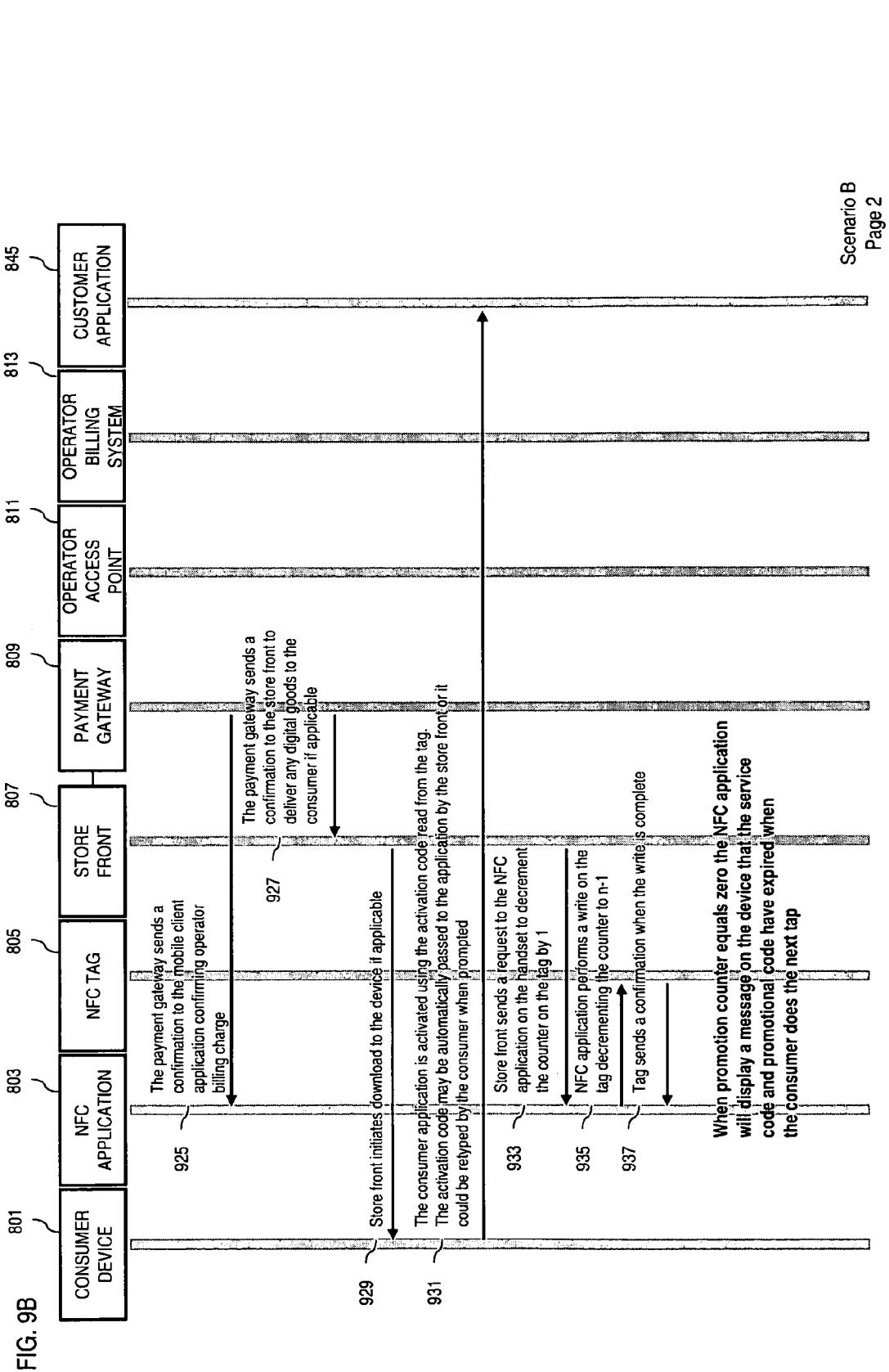

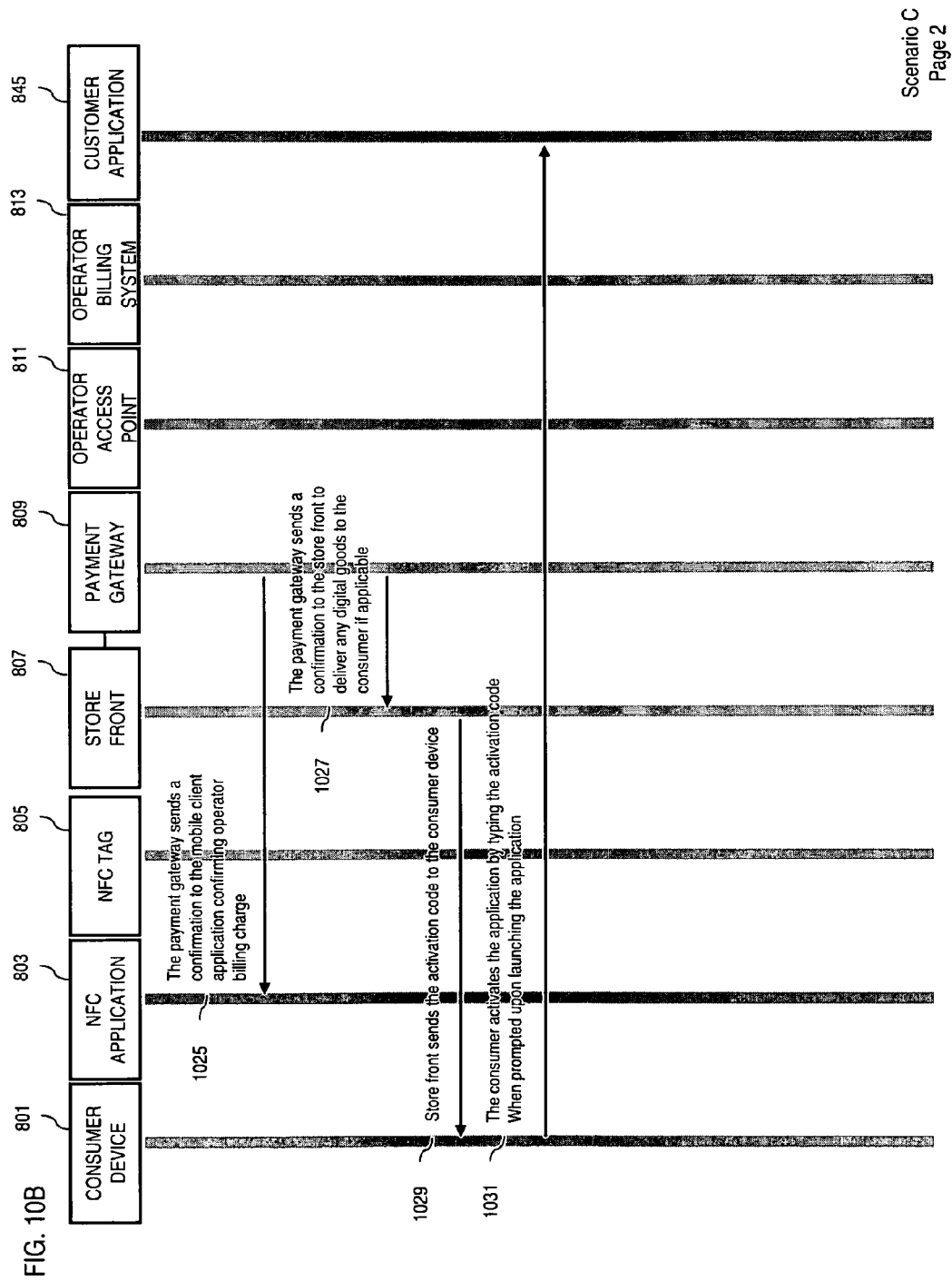

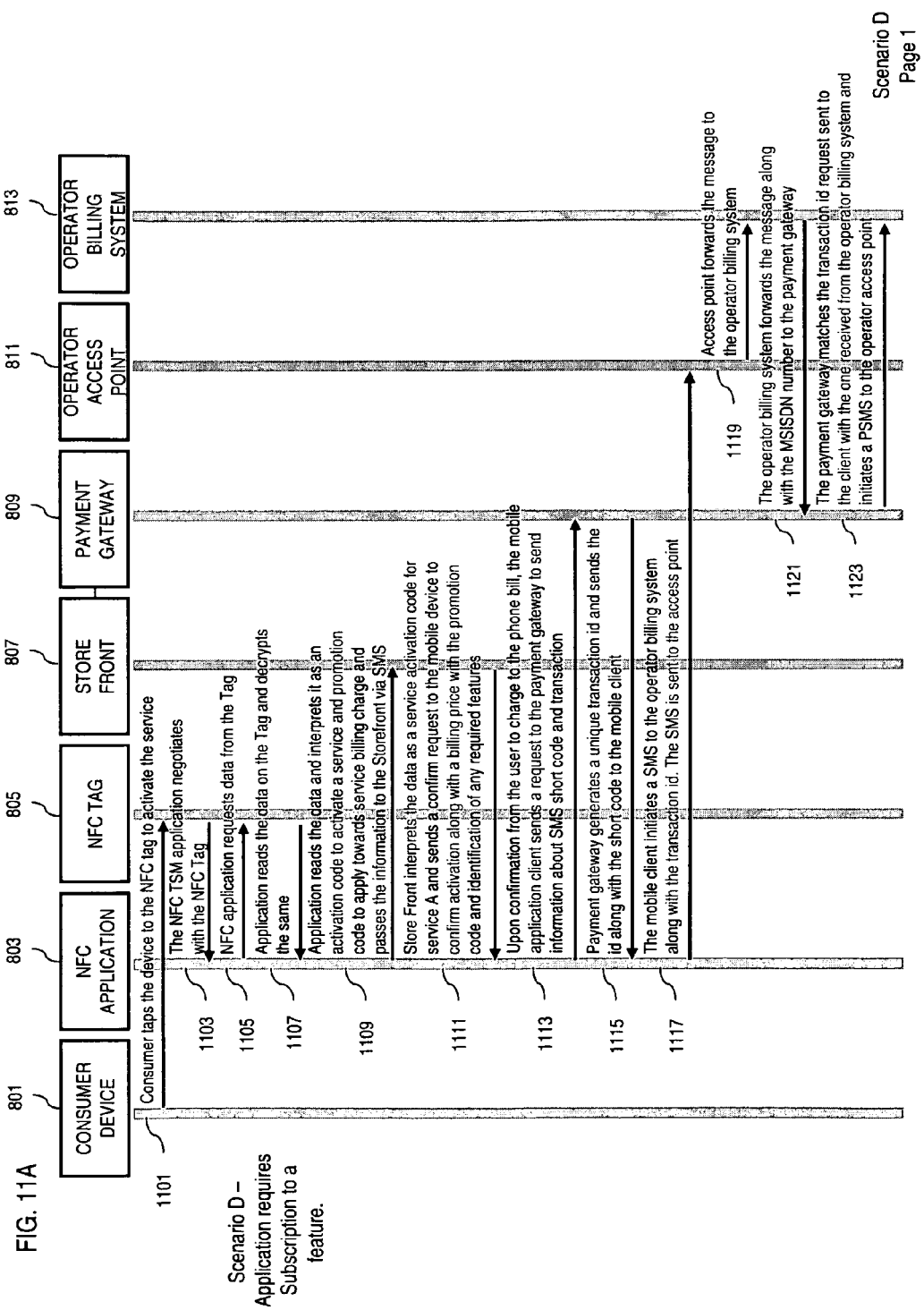

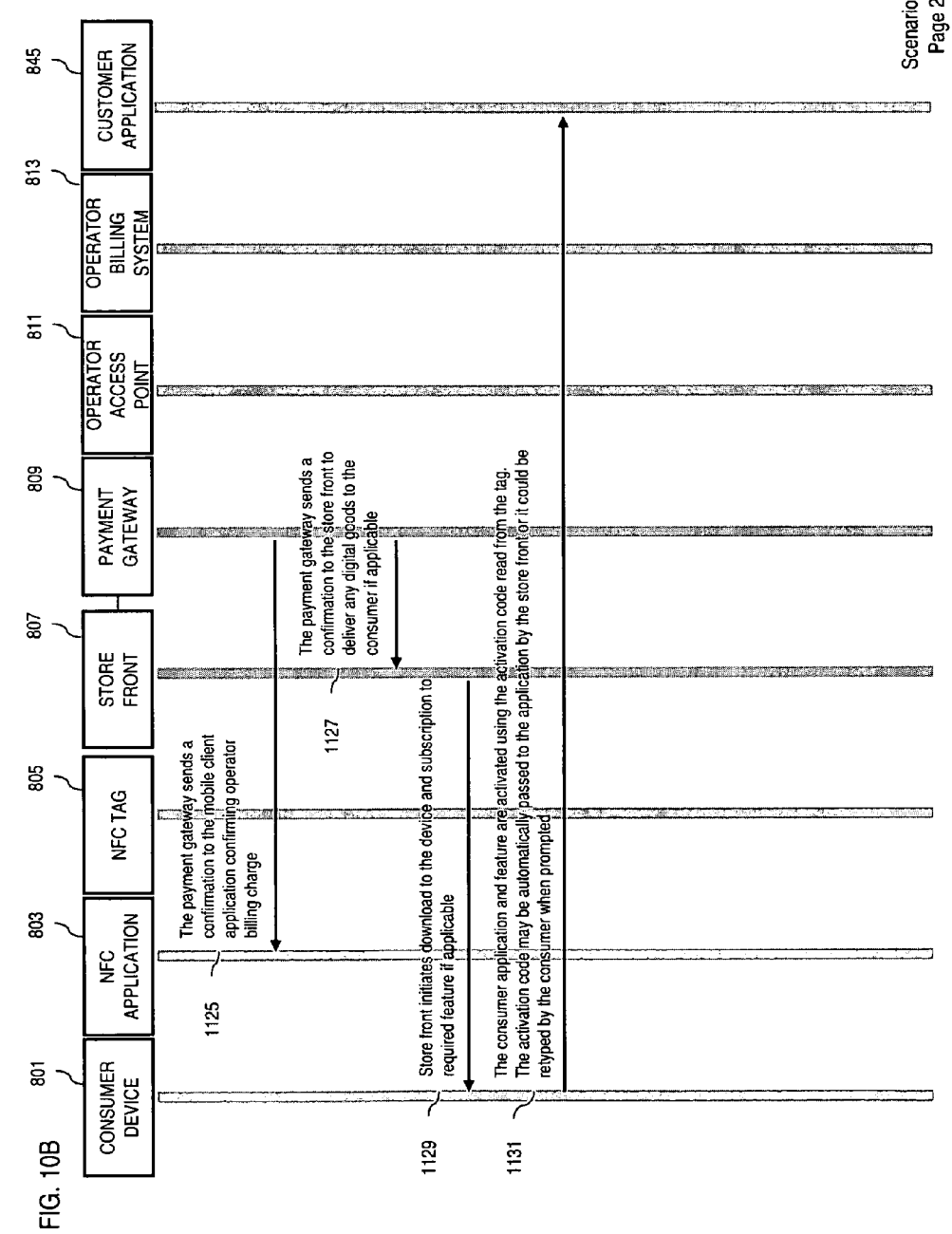

METHOD AND APPARATUS FOR MANAGING SERVICES USING BEARER TAGS

BACKGROUND

Wireless (e.g., cellular) service providers and device manufacturers are continually challenged to deliver value and convenience to consumers by, for example, providing compelling services, applications, and content. Beyond the sophisticated functions already included in many devices, service providers and device manufacturers are making a greater array of optional services (e.g., music, games, video, navigation, products, etc.) available to consumers. This increased variety, however, may conflict with the goal of delivering convenience to the consumer, in that generally it is more difficult for a consumer to manage (e.g., discover, select, access, purchase, activate, modify, bill, etc.) a large library of services. Therefore, to be competitive and to promote the greater discovery and use of available services, the service providers and manufacturers need to address the ever growing requirement for more approaches for efficient and convenient management of services.

Some Exemplary Embodiments

Therefore, there is a need for an approach for simple and automated management of services.

According to one embodiment, a computer-readable storage medium carrying one or more sequences of one or more instructions which, when executed by one or more processors, cause the one or more processors to initiate determination of service information related to one or more services from a bearer tag. The one or more processors are also caused to generate one or more service requests to manage the one or more services according to the service information. The one or more processors are further caused to initiate transmission of the one or more service requests to a services platform for management of the one or more services according to a billing arrangement.

According to another embodiment, an apparatus comprising a processor and a memory storing executable instructions that if executed cause the apparatus to initiate determination of service information related to one or more services from a bearer tag. The processor and the memory are also caused to generate one or more service requests to manage the one or more services according to the service information. The processor and the memory are further caused to initiate transmission of the one or more service requests to a services platform for management of the one or more services according to a billing arrangement.

According to yet another embodiment, a computer-readable storage medium carrying one or more sequences of one or more instructions which, when executed by one or more processors, cause the one or more processors to receive a request from a user to manage one or more services corresponding to a bearer tag. The one or more processors are also caused to determine billing information for the one or more services. The one or more processors are further caused to generate a message requesting confirmation to manage the one or more services, the message including billing information related to the one or more services. The one or more processors are further caused to initiate transmission of the message to the user. The one or more processors are further caused to receive a response message from the user. the one or more processors are further caused to initiate management of the one or more services according to the response message.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a communication system capable of managing services using bearer tags, according to an exemplary embodiment;

FIG. 3 is a flowchart of a process for requesting the activation or modification a service corresponding to a bearer tag, according to an exemplary embodiment;

FIG. 4 is a flowchart of a process for managing services using a user equipment, according to an exemplary embodiment;

FIG. 5 is a flowchart of a process for activating or modifying a service corresponding to a bearer tag, according to an exemplary embodiment;

FIGS. 8A and 8B are time sequence diagrams that illustrate a sequence of messages and processes for managing a service including an application download, according to various exemplary embodiments;

FIGS. 9A and 9B are time sequence diagrams that illustrate a sequence of messages and process for managing a service including a limited number of activations, according to various exemplary embodiments;

FIGS. 10A and 10B are time sequence diagrams that illustrate a sequence of messages and processes for management a service including an application resident on a user equipment, according to various exemplary embodiments;

FIGS. 11A and 11B are time sequence diagrams that illustrate a sequence of messages and processes for management a service including an application that requires subscription to another feature, according to various exemplary embodiments;

DESCRIPTION OF EXAMPLE EMBODIMENTS

Figure 2A:
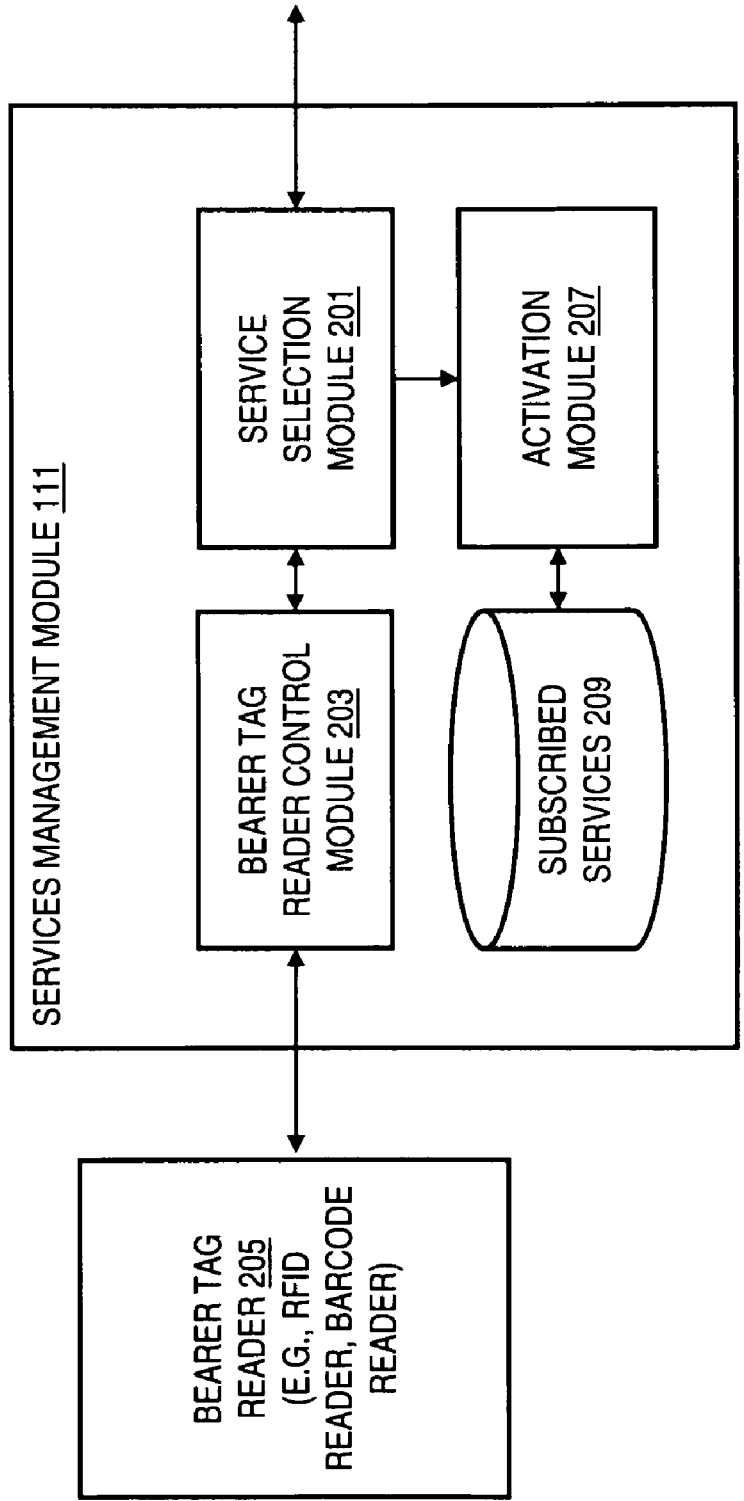
FIGS. 2A and 2B are diagrams of components of a services management module and components of a services platform, according to various exemplary embodiments.

A software product and apparatus for managing one or more services using bearer tags are disclosed. As previously stated, the term "services" as used herein refers collectively to services, applications, and content in a network and/or user equipment. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a communication system capable of managing services using bearer tags, according to an exemplary embodiment. As shown in FIG. 1, a system 100 comprises one or more user equipment (UEs) (e.g., UEs 101a-101n) having connectivity to a communication network 103. The UEs 101a-101n are any type of fixed terminal, mobile terminal, or portable terminal including desktop computers, laptop computers, handsets, stations, units, devices, multimedia tablets, Internet nodes, communicators, Personal Digital Assistants (PDAs), mobile phones, mobile communication devices, digital camera/camcorders, audio/video players, positioning devices, game devices, televisions, and/or the like, or any combination thereof. It is also contemplated that the UEs 101a-101n can support any type of interface to the user (such as "wearable" circuitry, etc.). The UEs 101a-101n permit rapid management, like for example discovery, activation, accessing, modification, and set-up of one or more services, including services, applications, and content, or any combination thereof (referred to herein as "services").

By way of example, the communication network 103 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The system 100 also includes bearer tags 105a-105n with each bearer tag 105 corresponding, for example, to one or more services. In exemplary embodiments, the bearer tag 105 is a near field communication (NFC) tag, radio frequency identification (RFID) tag, contactless card, barcode, or any combination thereof that contains information related to the one or more corresponding services. The service information contained in the bearer tag 105 may include, for instance, one or more service codes to identify the one or more services represented by the bearer tag 105. It is contemplated that in other embodiments, the bearer tag 105 may contain additional service related information (e.g., expiration date, use restrictions, etc.). The bearer tags 105a-105n, for instance, are embedded in, attached to, or printed on any of a variety of materials capable of supporting the tag (e.g., packaging material, a sticker, a poster, a card, etc.). The UEs 101a-101n each include one or more readers capable of reading the bearer tags 105a-105n, e.g., a near field communication (NFC) reader, radio frequency identification (RFID) reader, contactless card reader, barcode reader, camera, and/or the like, or any combination thereof.

By way of example, NFC, RFID, contactless card, and similar technologies are short-range wireless communication technologies that enable the exchange of data between devices over short distances (e.g., the range for NFC is approximately 4 inches). In general, these technologies comprise two main components, a tag (e.g., attached to an object) and a reader (which can be implemented with the UEs 101a-101n). Communication between the reader and the tags occur wirelessly and may not require a line of sight between the devices. The tag (e.g., an RFID transponder) is, for instance, a small microchip that is attached to an antenna. The tags can vary in sizes, shapes, and forms and can be read through many types of materials.

Moreover, the tags may be passive tags or active tags. Passive tags are generally smaller, lighter, and less expensive than active tags. Passive tags are only activated when with the response range of a reader. The reader emits a low-power radio wave field that is used to power the tag so as to pass on any information that is contained on the chip. Active tags differ in that they incorporate their own power source to transmit rather than reflect radio frequency signals. Accordingly, active tags enable a broader range of functionality like programmable and read/write capabilities.

A reader typically contains a transmitter, receiver, control unit, and an antenna. The reader performs three primary functions: energizing the tag, demodulating and decoding the returned radio signal. In certain embodiments, a reader includes an additional interface to convert the returned radio signal to a form that can be passed to another system such as a computer or programmable logic controller.

A barcode reader relies on optical technology to read a barcode. Typically, the barcode reader's photo sensors optically scan a barcode to convert the bars comprising a barcode image into one or more alphanumeric characters. These characters then represent the code. In certain embodiments, the barcode includes an additional checksum bar to ensure accurate decoding.

As shown in FIG. 1, the UEs 101a-101n have connectivity to a services platform 107 and a network billing system 109 through the communication network 103. In exemplary embodiments, the services platform 107 links the service information contained in the bearer tags 105a-105n with their corresponding services to activate, modify, or otherwise manage the services on the UEs 101a-101n. In certain embodiments, the services platform 107 also interacts with the network billing system 109 to coordinate payment and billing for the services. The network billing system 109 is owned by, for instance, a service provider (e.g., cellular service provider) through which the users of UEs 101a-101n have their communication (e.g., wireless) service. Accordingly, the user of UEs 101a-101n generally already has a billing relationship with the network billing system 109 and the associated service provider.

According to certain embodiments, the system 100 enables the management of one or more services. As seen in FIG. 1, the UEs 101a-101n include, for instance, a services management module 111 to manage the one or more services. It is contemplated that the term "management" of services as used herein refers to actions including discovering a service, selecting a service, activating a service, modifying a network, cancelling a service, paying for a service, and the like. Traditionally, a user searches for and discovers services by, for instance, paging through lists of available services on a UE 101. This process can be complex and cumbersome (e.g., requires extensive typing on a mobile device), particularly when the UE 101, for example, is a device limited input capabilities (e.g., a handset with a numeric keypad). After finding and selecting a desired service, the user must then provide payment information. Like the selection process, the payment process can also be inconvenient and taxing. The complexity and difficulty of manager services using traditional methods may discourage users form using a service they might otherwise subscribe.

To address this problem, a mechanism, e.g., services management module, is introduced to detect input from a user for managing (e.g., activating or modifying) a service corresponding to a bearer tag 105. In exemplary embodiments, reading the service information from the bearer tag 105 quickly identifies the requested service. A request is generated to manage the service according to the service information from the bearer tag 105, and is forwarded to the services platform 107 for processing according to a billing arrangement or a predetermined billing arrangement with, for instance, the carrier. For example, the billing arrangement is effected using mechanisms such as premium short message service (PSMS), wireless application protocol (WAP) billing service. The billing arrangement also may be configured to bill the user periodically (e.g., one a month) without additional action from the suser.

Moreover, the process of managing a service may occur automatically, thereby enabling a user to initiate a service by, for instance, simply tapping or bringing a UE 101 close to a bearer tag 105 associated with the service. It is noted that a service that can be initiated quickly and billed through a single tap is likely to be more attractive to users, which can drive more users to the service.

By way of example, the UEs 101a-101n communicate with the other devices on the communication network 103 (e.g., the services platform 107) using standard protocols. In this context, a protocol includes a set of rules defining how the network nodes within the communication network 103 (e.g., UEs 101a-101n and services platform 107) interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled "Interconnections Second Edition," by Radia Perlman, published September 1999.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2B:
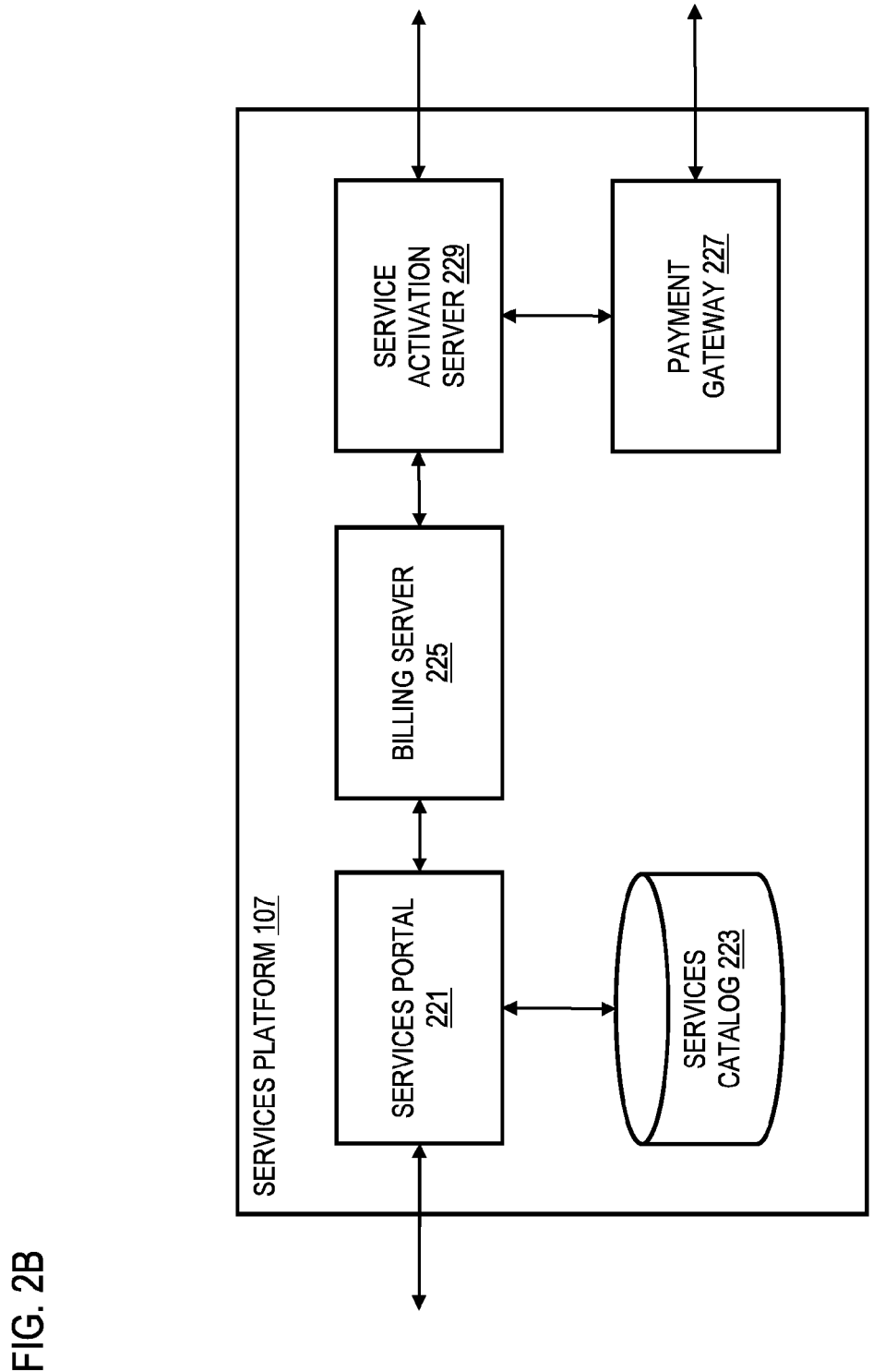

FIGS. 2A and 2B are diagrams of components of a services management module and components of a services platform respectively, according to various exemplary embodiments. As shown in FIG. 2A, the services management module 111 includes several sub-modules to manage services corresponding to bearer tags 105a-105n. It is contemplated that the functions of the sub-modules may be combined or performed by other components or logic of the UE 101. In exemplary embodiments, the services management module 111 includes a service selection module 201 for detecting a request from a user to manager a service corresponding to a bearer tag. The module 201 may, for instance, interact with a bearer tag reader control module 203 to detect the request. By way of example, the user request may be indicated by tapping the UE 101 one or more times on or near the bearer tag. The number of taps to initiate a request is configurable by the user, the service provider, or both. It is also contemplated that tapping includes bringing the UE at least sufficiently close enough to the bearer tag 105 so that the UE 101 can detect a return signal from the bearer tag 105. A physical tap is not necessary. In addition or alternatively, the user can signal a request to manage a service by activating one or more buttons or menu options on the UE 101, by causing the user UE 101 to read the bearer tag (e.g., cause the UE 101's barcode reader to scan a barcode), or by any combination thereof.

After detecting a service request, the service selection module 201, for example, causes the reader tag control module 203 to interact with an external bearer tag reader 205 (e.g., RFID reader, barcode reader). More specifically, the module 203, for instance, initiates the reader 205 to determine the service information contained in the bearer tag 105 and receives the raw data from reader 205 for processing by the service selection module 201. In certain embodiments, the bearer tag reader is a component of the UE 101 (e.g., a handset with a built-in reader) in which the services management module 111 resides. In other embodiments, the reader may be an external peripheral attached to the UE 101 (e.g., a barcode scanner connected to a PDA).

The service selection module 201 then uses the service information to generate a service management request for transmission to the services platform 107. The service management request, for instance, includes information such as the requested service and identification of the user. It is contemplated that the request may include other information needed to process to specific requests (e.g., quantity of product, duration of subscription, etc.).

In certain embodiments, the service selection module 201 is also configured to receive and process a request from the services platform 107 to confirm service management requests. By way of example, the confirmation request from the services platform 107 includes billing information, if any, associated with the requested management action. After confirmation and subsequent completion of any management action, the service selection module 201 interacts with the activation module 207 to activate the request service or implement any modifications. The activation module 207 has connectivity to a database 209 of subscribed services for storing service records and settings.

FIG. 2B is a diagram of the components of a services platform, according to an exemplary embodiment. As shown in FIG. 2B, the services platform 107 includes several components to manage services corresponding to bearer tags 105a-105n. It is contemplated that the functions of the components may be combined or performed by other components within the platform 107. In exemplary embodiments, the services platform 107 includes a services portal (e.g., store front) 221 for receiving service management requests and delivering services to the UEs 101a-101n. The services portal 221 has connectivity to a services catalog database 223 containing information to identify the services of the received request using the service information from the corresponding bearer tag 105. On receipt of a request the services portal 221 interacts with the database 223 and billing system (e.g., server) 225 to determine user information and/or the billing information (e.g., monthly fee, discounts, promotions, product cost, etc.) associated with the received service management request. The services portal 221 uses the billing information to generate a message requesting confirmation of the service management request from the user.

On receipt of the user confirmation, the services portal 221, for example, directs the payment gateway 227 to collect the fees associated with the request. In exemplary embodiments, the payment gateway 227 may interact with the network billing system 109 to collect payment using, for example: (1) direct billing to the user using the International Mobile Station Identity (IMSI) associated with the user's UE 101, wherein the user's phone bill is directly charged for any fees and the payment gateway 227 makes a billing request to the network billing system 109 to recover the fees based on the IMSI; (2) direct billing using a 3G/GPRS access point, wherein the user's phone bill is directly charged for any fees and the payment gateway 227 makes a billing request to the network billing system 109 to recover the fees based the network assigned ID (e.g., a Mobile Subscriber Integrated Digital Services Network (MSISDN) number); (3) direct billing using a wireless access protocol (WAP) access point, wherein the user's phone bill is directly charged for any fees and the payment gateway 227 makes a billing request to the network billing system 109 to recover the fees based the network assigned ID (e.g., MSISDN) (i.e., WAP direct billing); (4) direct billing using WAP, wherein the user accesses a WAP portal to authorize payment against the user's phone bill and the payment gateway 227 makes a billing request to the network billing system 109 to recover the fees (i.e., WAP online billing); (5) direct billing using premium short message service (SMS) MO billing wherein an SMS sent from the user's device triggers direct billing against the user's phone bill and wherein the network billing system 109 sends the collected fees to the payment gateway 227 based on the SMS transaction identification; and (6) direct billing using premium short message service (SMS) MT billing wherein an SMS sent to the user's device triggers direct billing against the user's phone bill and wherein the network billing system 109 sends the collected fees to the payment gateway 227 based on the SMS transaction identification. In exemplary embodiments, the user, the service provider, or both can configure the payment mechanism used by the services platform 107.

After collecting the appropriate payment, the payment gateway 227 sends the payment or, in some cases, verification of the payment to the services portal 221. The services portal 221 then interacts with the service activation system 229 (which may be implemented as a server) to initiate activation or modification of a service according to the service management request.

FIG. 3 is a flowchart of a process for managing services, according to an exemplary embodiment. In one embodiment, the services management module 111 performs the process 300 and is implemented in, for instance, a chip set including a processor and a memory as shown FIG. 9. At 301, the module 111 detects input from a user for activating or modifying a service corresponding to a bearer tag 105. At the chip level, the module 111 detects the input by, for instance, receiving a signal via the bearer tag reader control module 203 that a bearer tag 105 has been detected. In certain embodiments, a user input is not needed to initiate certain services or features (e.g., activation of a service), and service management may proceed with no user input. The module 111 then initiates a determination of the service information contained within the bearer tag 105 by signaling the bearer tag reader 205 to read the bearer tag 105 (at 303). Based on the service information, the module 111 generates a service management request (e.g., subscribe to an E-mail service, purchase a song, cancel a subscription) (at 305) and initiates transmission of the request to the services platform 107 for completing the service management request according to a predetermined billing arrangement (at 307).

Next, the module 111 receives a message from the services platform 107 requesting confirmation of the service management of the service management actions that the services platform 107 will perform (at 309). On receipt of the request, the module 111 detects a user input indicating a response to the confirmation request (e.g., proceed with request, or cancel request) (at 311). The module 111 then generates a message containing the user's response to the confirmation request (at 313) and initiates transmission of the message to the services platform 107 (at 315).

FIG. 4 is a flowchart of a process for managing services using a user equipment, according to an exemplary embodiment. As discussed previously, exemplary embodiments include the services management module 111 within the UEs 101a-101n (e.g., hardware such as a wireless handset, laptop computer, etc.). The incorporation of the module 111 within the UEs 101a-101n extends the functions of the module 111 to the network or communication system 103 in which the UE 101 operates. Additionally, certain embodiments configure the UE 101 to include components (e.g., a bearer tag reader 205, wireless transmitter (not shown)) not included with the module 111. Consequently, the UE 101a, for example, is capable of directly reading the bearer tag 105 and transmitting messages over the communication network 103.

Process 400 begins with the UE 101 indicating a user input for managing a service corresponding to a bearer tag 105 (at 401). In certain embodiments, the user input is indicated by tapping a user equipment one or more times on or near the bearer tag 101, by activating one or more buttons or menu options on the UE 101 itself, by using the UE 101 to read the bearer tag 105, or by a combination thereof. It is contemplated that the user, the service provider, or both may configured the number of taps, buttons, or menu options to indicate a service management request. It is also contemplated that in certain embodiments, a user input is not needed to initiate certain services or features (e.g., activation of a service), and service management may proceed with no user input. The UE 101a then reads service information contained in the bearer tag 105 using, for instance, an NFC reader, RFID reader, contactless card reader, a barcode reader, or any combination thereof (at 403). Based on the service information, the UE 101a generates a service management request message (at 405) and transmits the message, per at 407, to the services platform 107.

Like the process described with respect to the services management module 111, the UE 101a receives a message from the services platform 107 providing the associated billing information and requesting confirmation of the service action (at 409). Next, the UE 101a receives input from the user responding to the request (e.g., proceed with request or cancel request) (at 411), generates a response message based on the user input (at 413), and transmits the response message to the services platform 107 (at 415) for instructing the services platform 107.

In exemplary embodiments, the UE 101 may be configured to perform the process 400 to manage a service (e.g., initiate a service) using a "one tap" mode of operation. In this mode, a single tap (or other similar action) on a bearer tag 105 as described at 401 initiates the service management action (e.g., service activation). All other actions of the process 400, as well as any associated service enablement and billing actions, are completed automatically by the services platform 107 and network billing system 109 using previously stored information (e.g., account, billing, and payment information) related to the user. This information, for example, was collected from the user when the user initiated the wireless service. In this way, the user need not input any previously stored information when managing services under the process 400.

As discussed previously, the use of a one tap mode of operation for managing (e.g., activating, purchasing, subscribing, etc.) a service may improves overall convenience to the user when accessing the service. This added convenience may in turn encourage greater use of the service.

FIG. 5 is a flowchart of a process for managing a service corresponding to a bearer tag, according to an exemplary embodiment. In this example, the services platform 107 receives a request to manage (e.g., activate or modify) a service corresponding to a bearer tag 105 from the UE 101, at 501. The request, for instance, identifies the service according to the service information contained in the bearer tag 105 as well as the UE 101 making the request. In response, the services platform 107 identifies the requested service and associated billing information using, for example, the services catalog database 223 (at 503). The platform 107 then generates a message requesting that the user confirm service management request and billing information (at 505) and initiates a transmission of the request to the user (at 507).

In certain embodiments, the one or more services corresponding to a bearer tag 105 can be limited to certain geographical areas (e.g., Atlanta or New York City). In this case, the services platform 107 is also configured to validate the service management request based on location. The term "validate" refers to a process for ensuring that a UE 101 meets the conditions (e.g., location requirement) to manage a service. To validate the location information, the services platform 107 may obtain the location of the UE 101 by, for instance, identifying the wireless communication cell in which the UE 101 is operating, using the global positioning satellite (GPS) receiver of the UE 101, or using other like location technologies. In one embodiment, the location restriction for a service may be classified alternatively or additionally by continent (i.e., a particular service is available only in North America or Europe). By way of example, the location restriction associated with a service is included in the bearer tag 105 as a location validation identifier as illustrated in Table 1. Table 1 also includes a validity date associated with each identifier. The validity date indicates the effective date or dates for the location restriction.

TABLE 1

| Location Validation Identifier | Area | Continent | Validity Date |
| --- | --- | --- | --- |
| 1-10000 | Atlanta, GA | North America | 2009 |
| 10001-20000 | New York, NY | North America | 2009 |
| 20001-30000 | Washington, DC | North America | 2009 |
| 30001-40000 | Dallas, TX | North America | 2009 |

In certain embodiments, it is contemplated that the services platform 107 may also use criteria other than location to validate a service management request originating from a bearer tag 105. For example, the services platform 107 can determine whether a service associated with a particular bearer tag 105 has already been activated or otherwise previously used. In one further embodiment, the services platform 107 can link a particular bearer tag 105 to a UE 101 by, for example, associating a bearer tag ID with the unique identifier corresponding to the UE 101 (e.g., international mobile equipment identity (IMEI)).

At 509, the services platform 107 receives a response message from the user. If the response confirms the service management request, the services platform 107 initiates the requested service management actions (at 511). In exemplary embodiments, the process of initiating the actions includes initiating the collection of appropriate payment for the service management request according to the methods of payment collection described with respect to the payment gateway 227 of FIG. 2B.

Figure 6A:
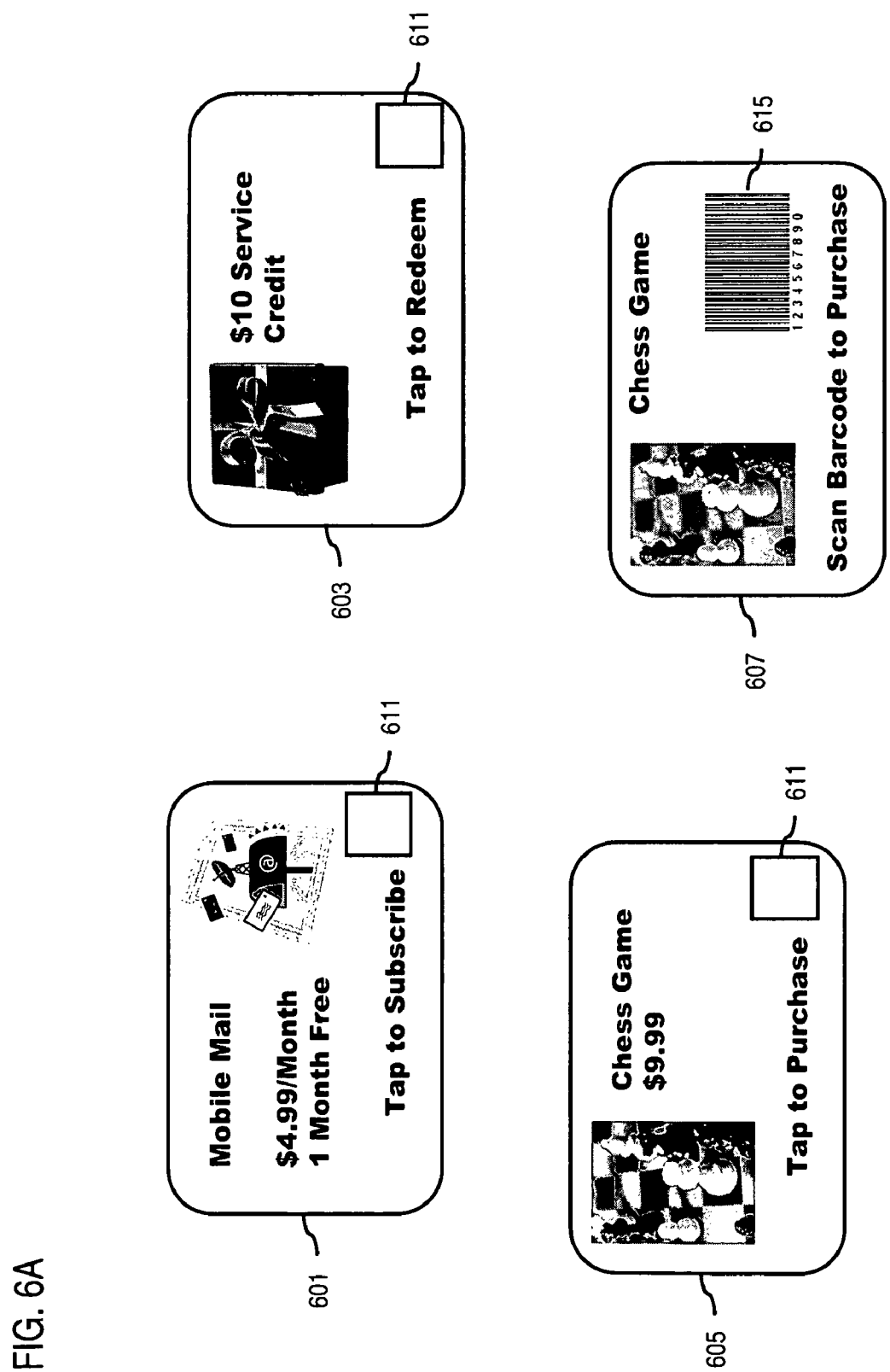
FIGS. 6A and 6B are diagrams of bearer tags and corresponding services, according to an exemplary embodiment.
Figure 6B:
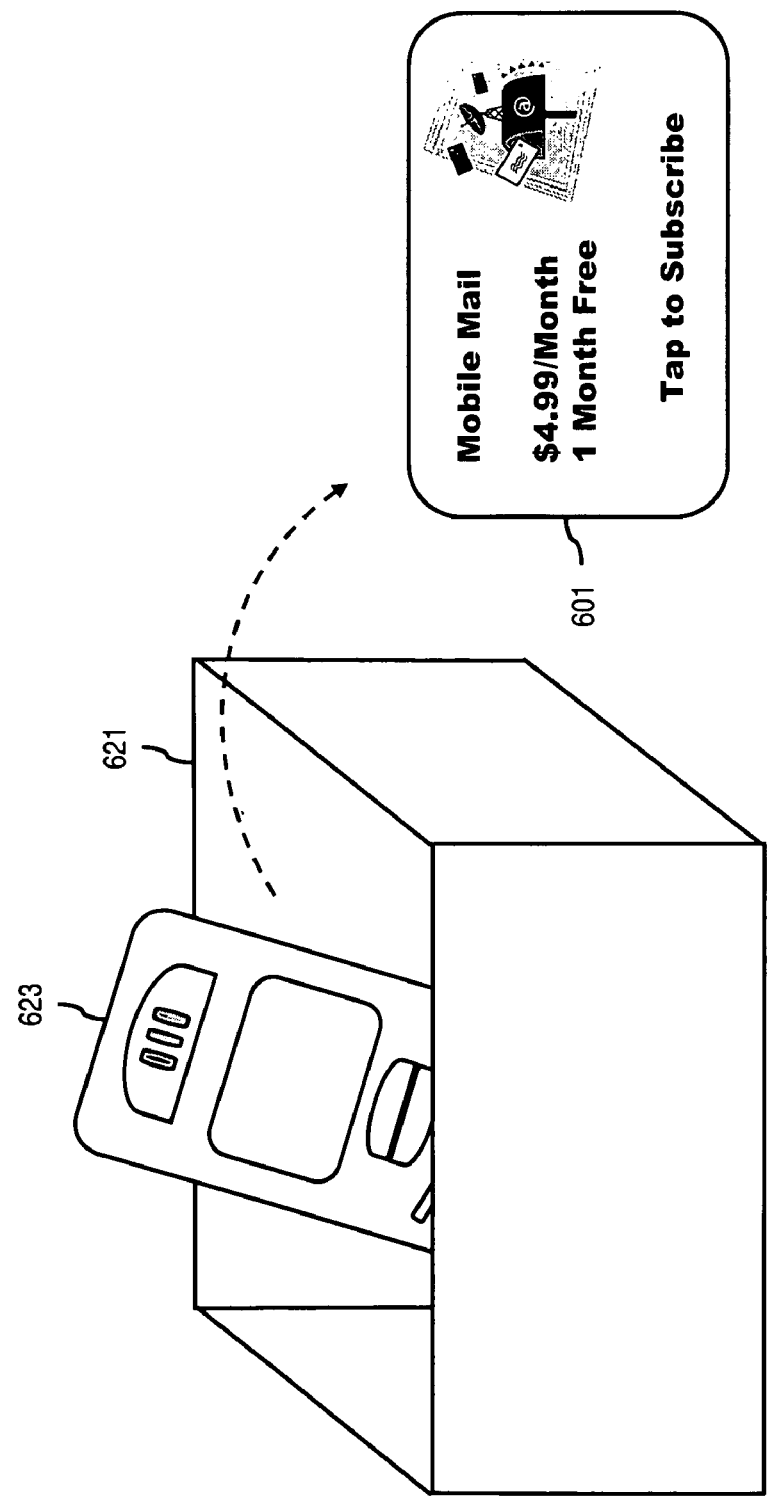

FIGS. 6A and 6B are diagrams of bearer tags and corresponding services, according to an exemplary embodiment. As shown in FIG. 6A, the bearer tags 601-607, for example, correspond to a variety of services and may use different types of bearer tags. For instance, bearer tags 601-605 include a wireless tag 609 (e.g., NFC, RFID, or contactless card), whereas bearer tag 607 includes a barcode tag 611. Moreover, the bearer tag 601 corresponds to an E-mail subscription service, the bearer tag 603 corresponds to a service credit that can be immediately applied to a user's phone bill, and bearer tags 605 and 607 correspond to the purchase a game (e.g., chess).

In one embodiment, the billing information for the service may be printed or displayed on the tag itself (e.g., bearer tags 601-605). In other embodiments (e.g., bearer tag 607), the billing information is not display on the tag. Instead, the tag 607 can be configured, for instance, to display the billing information when the tag is read.

In another embodiment, the bearer tag may be configured to activate any dependent features (e.g., a data plan) in addition to the requested service. For example, bearer tag 601 may be used to subscribe to an Mobile Mail e-mail service. In this example, the services platform 107 is configured to require a data plan when subscribing to the Mobile Mail service. On activation of the tag 601 by a UE 101, the services platform automatically initiates subscription to a data plan along with activating the service if the UE 101 does not already have a data plan.

Although the bearer tags are displayed in FIG. 6A as cards, it is contemplated that the bearer tags 601-607 may take any form capable of being embedded or printed with a bearer tag.

FIG. 6B is a diagram depicting a distribution method for a bearer tag, according to an exemplary embodiment. It is contemplated that the bearer tags 601-607 of FIG. 6A may be distributed using any suitable method (e.g., distribution within a user equipment box, with a monthly billing statement, in print advertisements, etc.). As shown in FIG. 6B, the Mobile Mail bearer tag 601 is included in the user equipment box 621 with the UE 623. For instance, the bearer tag 601 may be placed in the user equipment box 621 at the time of equipment purchase.

Table 2 summarizes the exemplary services and features associated with a bearer tag 105 in relation to the mechanism for distributing the bearer tag 105 and the dependent features already installed on the UE 101 as discussed with respect to FIGS. 6A and 6B. Scenario 1 includes a UE 101 preconfigured to include an application corresponding to a service (e.g., an E-mail application). The UE 101, however, does not have a data plan. In this scenario, a bearer tag 105 corresponding to, for instance, an E-mail service may be included in the equipment box to promote the use of a data plan with the service. The user initiates the service and the corresponding data plan via the bearer tag 105. Payment, for example, may then be made via a premium SMS (PSMS) message.

Scenario 2 is similar to scenario 1 with the exception that the UE 101 has already been provisioned with a data plan feature. This scenario, for instance, may be used to promote an E-mail service, instant messaging service, or games. In this case, the user merely has to activate and pay for the service using, for example, a wireless application protocol (WAP) billing page. This payment for be scheduled to automatically recur on a periodic basis (e.g., monthly) to maintain the service.

Scenario 3 includes a UE 101 that does not have an application corresponding to a service already installed on the device. The UE 101 also does not have a data plan feature already enabled. In this scenario, a bearer tag 105 that is distributed either in the equipment box or by other means may be used to initiate the service, download the corresponding application, and enable the dependent feature (e.g., a data plan). Under this scenario, the user may initiate payment for the service via, for example, an SMS short code or a WAP link.

Scenario 4 is similar to scenario 3 with the exception that the UE 101 already has the data plan feature provisioned on the device. In this case, the UE 101 may initiate a service and download of the corresponding application by the one tap method (i.e., single tapping the UE 101 on the bearer tag 105). A second or subsequent tap may then, for instance, initiate payment for the service or activate the service and any corresponding downloaded application.

Scenario 5 is similar to scenario 4 with the exception that the data plan already provisioned on the UE 101 is not adequate to take full advantage of the service (e.g., a premium video service require additional bandwidth). In this case, the user can initiate the service and upgrade to the recommended data plan feature using a bearer tag 105. The bearer tag 105, for example, may be sent to user by mail with the phone bill.

TABLE 2

| | User has no data plan feature | User has data plan feature | User needs to upgrade data plan feature to use service |
|---|---|---|---|
| Application corresponding to service is already on the UE 101; Bearer tag is distributed in the box | Scenario (1): Bearer tag 105 is used to advertise a data plan while pushing for user activation of a service (e.g., E-mail) pre-loaded in phone with payment via PSMS. | Scenario (2): Bearer tag 105 is linked to a wireless application protocol (WAP) billing page to bill or PSMS to bill for service usage on a periodic basis (e.g., monthly). | |
| Application corresponding to service is not preloaded on the UE 101; Bearer tag is distributed in or out of the box | Scenario (3): Bearer tag 105 is used to trigger authorization to download an application corresponding to the service via an SMS short code. Payment may be made via a WAP link reversed billed by the carrier or service provider. | Scenario (4): Bearer tag 105 is used to point to a secure web link to download an application corresponding to the service via a single tap. A second or subsequent tap can be configured to initiate payment after the application is installed or to activate the service and any corresponding downloaded application. | Scenario (5): Bearer tag 105 is used to upgrade the data plan for better service (e.g., premium video service). The bearer tag 105 may be sent by mail with the phone bill as advertising material. |

Figure 7:
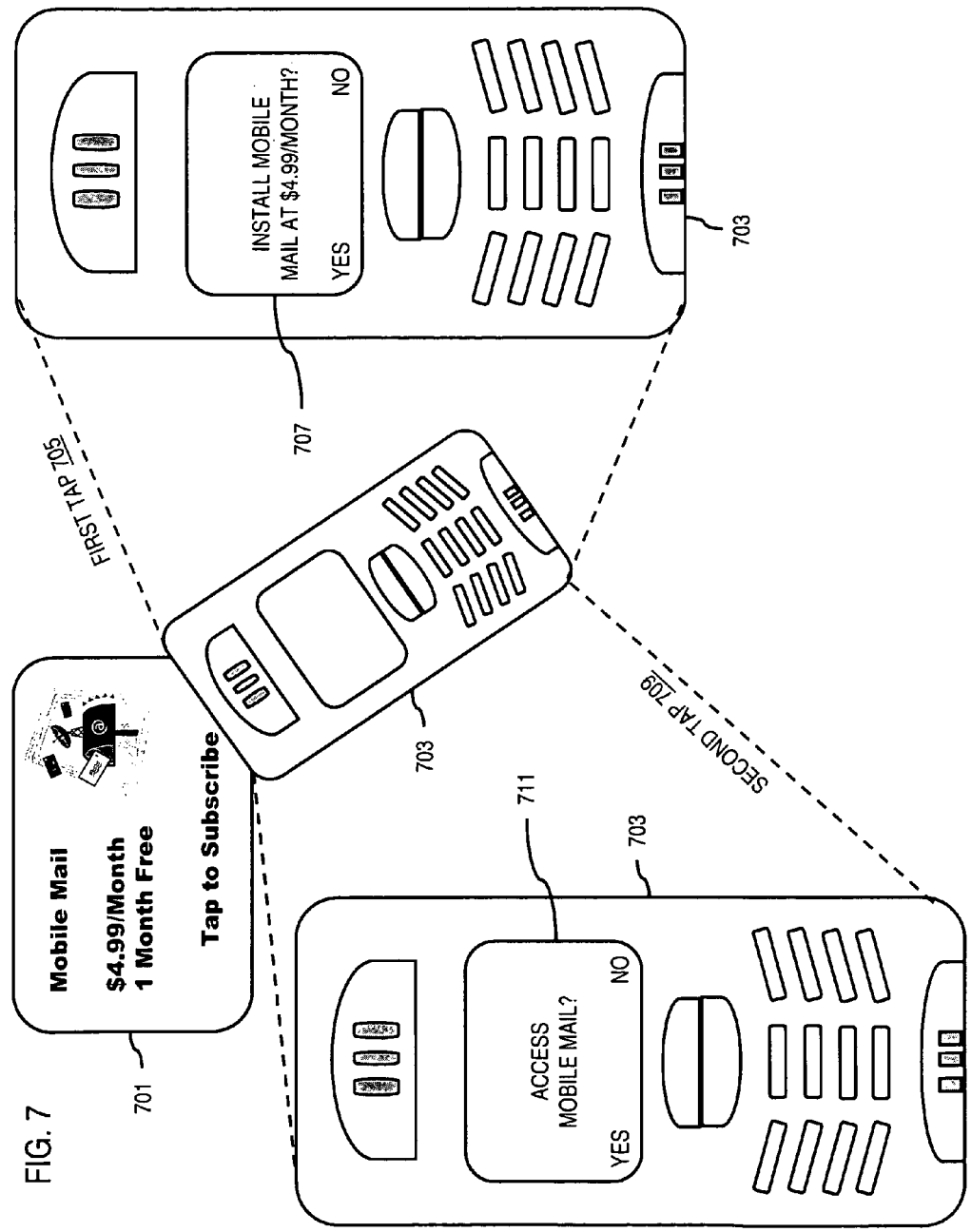
FIG. 7 is a diagram of a user interface utilized in the processes of FIGS. 5 and 6, according to an exemplary embodiment.

FIG. 7 is a diagram of a user interface utilized in the processes of FIGS. 5 and 6, according to an exemplary embodiment. In an exemplary embodiment, a bearer tag 701 (e.g., containing an NFC tag) is inserted in to the phone packaging for easy access by the user. In this example, the bearer tag 701 corresponds to an E-mail subscription service costing $4.99 per month with one month free on activation. The user of device 703 initiates a request to activate the E-mail service by tapping the device 703 on or near the bearer tag 701. The device 703 reads the NFC tag and requests activation of the service via, for example, the services platform 107. If this is a first tap 705 by the device 703 on the bearer tag 701, the services platform 107 processes the request and activates the service according to a predetermined billing arrangement (e.g., bill the service directly to the user's phone bill). The services platform 107 displays a confirmation message 707 presenting the billing information and asking for the user's consent to proceed with the subscription. The user may respond yes to finalize the service activation and agree to the billing arrangement or no to cancel the request. If the tap is a second tap 709 (or subsequent tap), the service platform 107, for instance, interprets the second tap 709 as a request to activate the service along with any corresponding application. Accordingly, the services platform 107 displays a message 711 requesting confirmation to access the service and the application. In this way, the user can use the bearer tag 701 to easily access the service following activation.

The described processes and arrangement advantageously, according to certain embodiments, provide a rapid and convenient mechanism for a user to identify and subscribe to services.

FIGS. 8-11 are time sequence diagrams that illustrate sequences of messages and processes of use case scenarios, according to various exemplary embodiments. A network process on the network is represented by a shaded vertical box. A message passed from one process to another is represented by horizontal arrows. A step performed by a process is indicated by the text.

The processes represented in FIGS. 8-11 are a consumer device 801, an NFC application 803, an NFC tag 805, a store front 807, a payment gateway 809, an operator access point 811, and a operator billing system 813. The consumer device 801 is an example of a UE 101. The NFC application 803 is an example of a service management module 111. The NFC tag 805 is an example of a bearer tag 105. The store front 807 is an example of the services portal 221. The payment gateway 809 is an example of the payment gateway 227. The operation access point 811 is an example of an access point to communication network 103. The operator billing system 813 is an example of the network billing system 109.

Figure 8B:
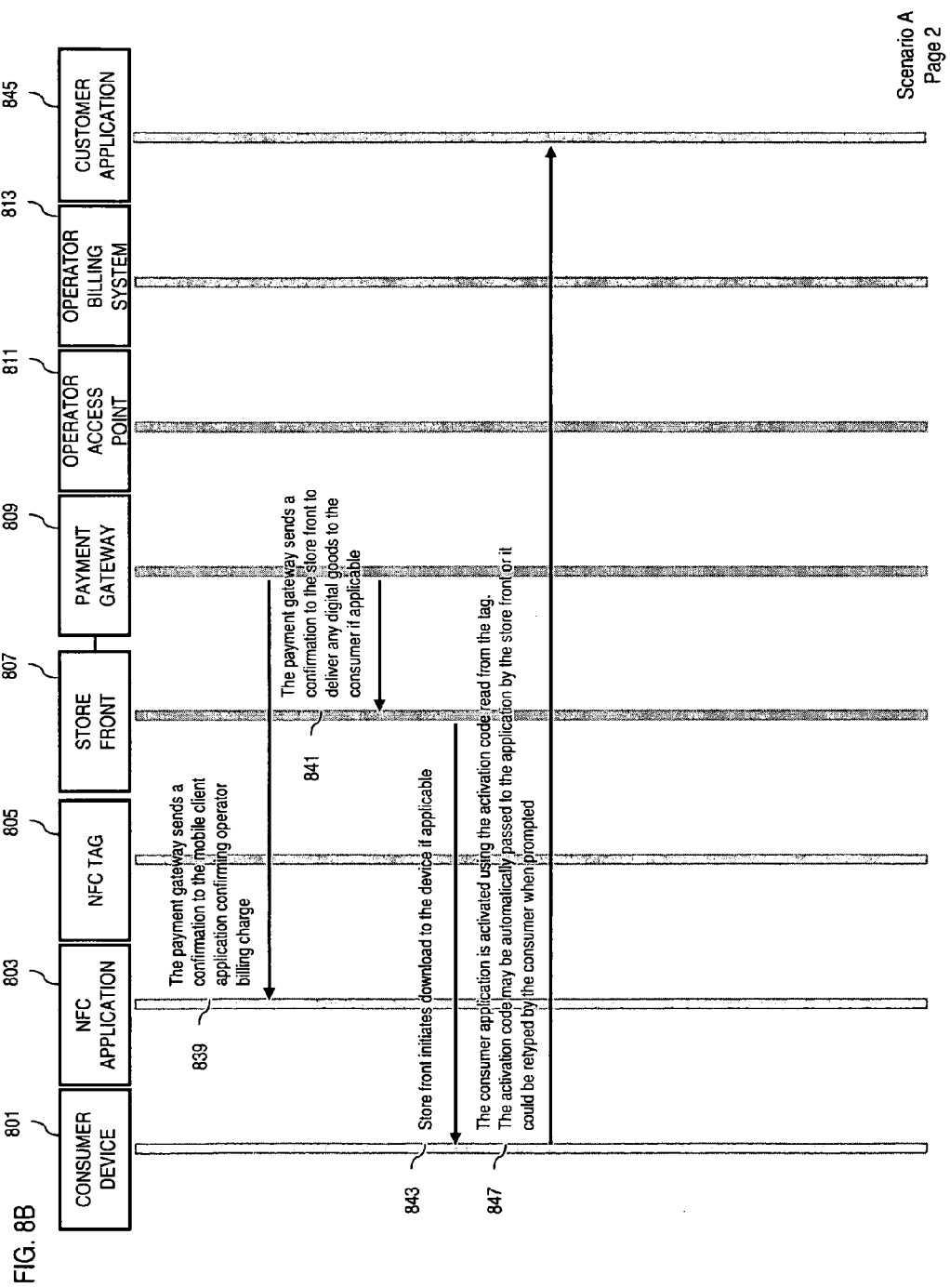

FIGS. 8A and 8B are time sequence diagrams that illustrate a sequence of messages and processes for managing a service including an application download, according to various exemplary embodiments. At 815, the consumer device 801 is tapped on the NFC tag 805 to activate a service. In response, the NFC application 803 negotiates with the NFC tag 805 (at 817) to request the service information from the NFC tag 805 (at 819). The NFC application 803 then reads and decrypts the service information from the NFC tag 805 (at 821).

In this example, the service information includes an activation code for a service and a promotion code to apply towards the service billing charge. At 823, the NFC application 803 reads the service information and interprets it as an activation code and a promotion code, and sends the service information to the store front 807 via an SMS message.

On receipt of the message, the store front 807 interprets the service information as a service activation code for a service and sends a confirmation request to the consumer device 801 (at 825). The confirmation message, for instance, contains the billing price for the service taking into account the promotion code.

Upon confirmation from the user to activate the service and to apply the charges to the user's phone bill, the NFC application 803 sends a request to the payment gateway 809 to send information on the SMS short code and transaction details for the service (at 827). Accordingly, the payment gateway 809 generates a unique transaction ID and sends the ID and the associated SMS short code to the NFC application 803 (at 829). The NFC application 803 initiates payment for the service by initiating an SMS message containing the transaction ID addressed to the SMS short code corresponding to the operator billing system 813 (at 831). The SMS is forwarded to the operator billing system 813 via the operator access point 811 (at 833).

After receiving the SMS message, the operator billing system 813 forwards the message along with the MSISDN number corresponding to the consumer device 801 to the payment gateway 809 (at 835). The payment gateway 809 matches the transaction ID sent to the client at 829 with the transaction ID received from the operator billing system 813, and initiates a premium rate SMS (PSMS) message to the operator billing system 813 (at 837). The payment gateway 807 also sends confirmation of the billing charge to the NFC application 803 (at 839) and confirmation to the store front 807 to deliver any digital goods associated with the service (at 841).

If applicable, the store front 807 initiates download of any application or other digital content to the consumer device 801 (at 843). The downloaded application 845 is activated using the activation code read from the NFC tag 805. The activation code may also be automatically passed to the NFC application 803 by the store front 807 or it may be manually entered by the consumer when prompted (at 847).

FIGS. 9A and 9B are time sequence diagrams that illustrate a sequence of messages and process for managing a service including a limited number of activations, according to various exemplary embodiments. At 901, a consumer device 801 is tapped on the NFC tag 805 to activate a service. In response, the NFC application 803 negotiates with the NFC tag 805 (at 903) to request the service information from the NFC tag 805 (at 905). The NFC application 803 then reads and decrypts the service information from the NFC tag 805 (at 907).

In this example, the service information includes three elements: a service activation code, promotion code, and a promotion counter. The promotion counter, for instance, limits the number of consumers who can activate the service. At 909, the NFC application 803 reads the service information and interprets it as an activation code to activate a service, a promotion code, and a promotion counter. The NFC application 803 checks that the activation code counter and the promotion counter are greater than zero. If they are, the NFC application 803 passes the service information to the store front 807 via an SMS message.

On receipt of the message, the store front 807 interprets the service information as a service activation code for a service and sends a confirmation request to the consumer device 801 (at 911). The confirmation message, for instance, contains the billing price for the service taking into account the promotion code.

Upon confirmation from the user to activate the service and to apply the charges to the user's phone bill, the NFC application 803 sends a request to the payment gateway 809 to send information on the SMS short code and transaction details for the service (at 913). Accordingly, the payment gateway 809 generates a unique transaction ID and sends the ID and the associated SMS short code to the NFC application 803 (at 915). The NFC application 803 initiates payment for the service by initiating an SMS message containing the transaction ID addressed to the SMS short code corresponding to the operator billing system 813 (at 917). The SMS is forwarded to the operator billing system 813 via the operator access point 811 (at 919).

After receiving the SMS message, the operator billing system 813 forwards the message along with the MSISDN number corresponding to the consumer device 801 to the payment gateway 809 (at 921). The payment gateway 809 matches the transaction ID sent to the client at 829 with the transaction ID received from the operator billing system 813, and initiates a premium rate SMS (PSMS) message to the operator billing system 813 (at 923). The payment gateway 807 also sends confirmation of the billing charge to the NFC application 803 (at 925) and confirmation to the store front 807 to deliver any digital goods associated with the service (at 927). If applicable, the store front 807 initiates download of any application or other digital content to the consumer device 801 (at 929). The downloaded application 845 is activated using the activation code read from the NFC tag 805. The activation code may also be automatically passed to the NFC application 803 by the store front 807 or it may be manually entered by the consumer when prompted (at 931).

In addition, the store front 807 sends a request to the NFC application 803 on the consumer device 801 to decrement the promotion counter on the NFC tag 805 by one (at 933). In response, the NFC application 803 performs a write operation on the NFC tag 805 to decrement to counter by one (at 935). The NFC tag 805 sends a confirmation to the NFC application 803 when the write operation is complete (at 937). When the promotion counter reaches zero the NFC application 803 displays a message on the device that the service code and promotion code have expired when the consumer next taps the NFC tag 805.

Figure 10A:
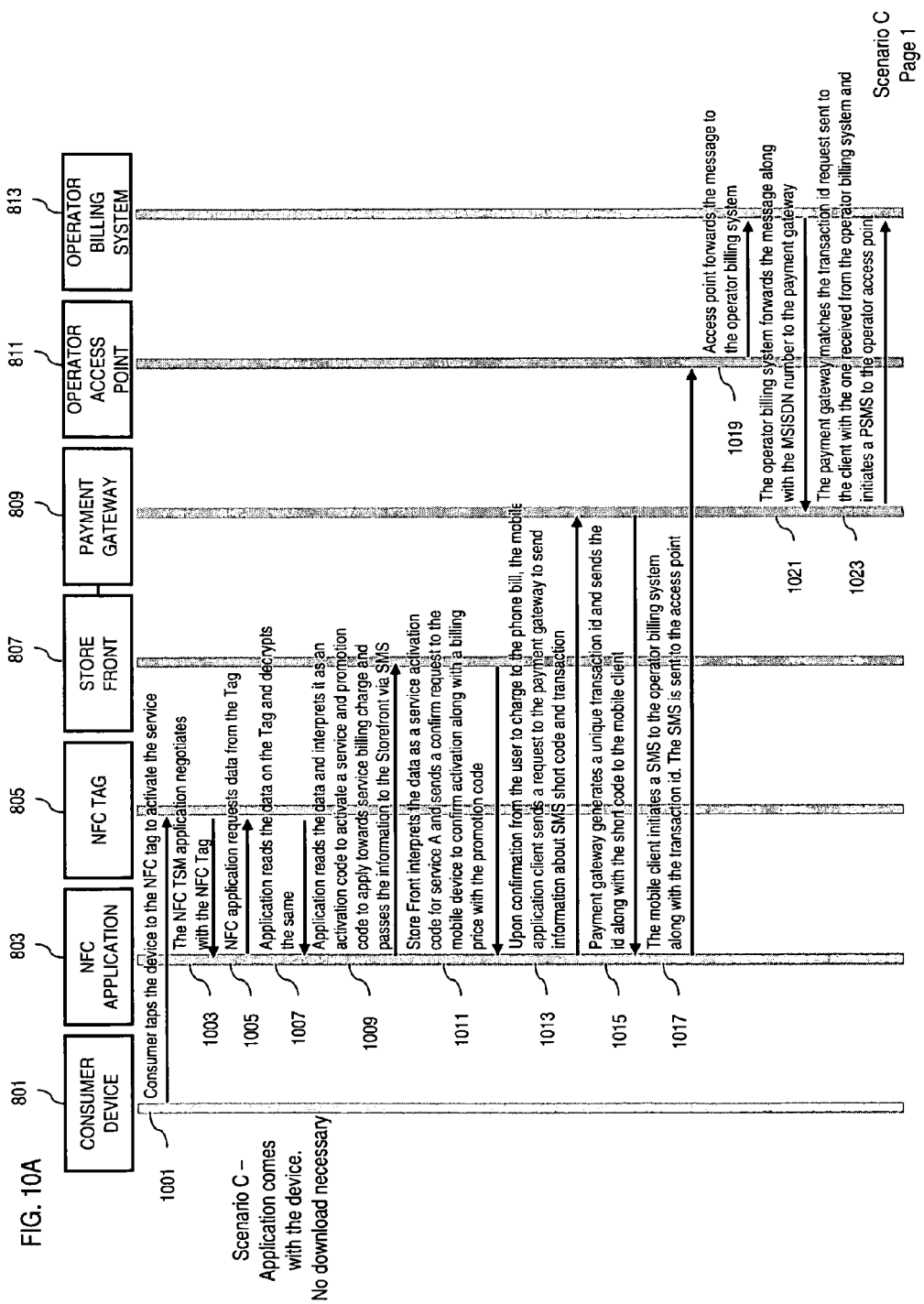

FIGS. 10A and 10B are time sequence diagrams that illustrate a sequence of messages and processes for management a service including an application resident on a user equipment, according to various exemplary embodiments. At 1001, a consumer device 801 is tapped on the NFC tag 805 to activate a service. In response, the NFC application 803 negotiates with the NFC tag 805 (at 1003) to request the service information from the NFC tag 805 (at 1005). The NFC application 803 then reads and decrypts the service information from the NFC tag 805 (at 1007).

In this example, the service information includes an activation code for a service and a promotion code to apply towards the service billing charge. At 1009, the NFC application 803 reads the service information and interprets it as an activation code and a promotion code, and sends the service information to the store front 807 via an SMS message.

On receipt of the message, the store front 807 interprets the service information as a service activation code for a service and sends a confirmation request to the consumer device 801 (at 1011). The confirmation message, for instance, contains the billing price for the service taking into account the promotion code.

Upon confirmation from the user to activate the service and to apply the charges to the user's phone bill, the NFC application 803 sends a request to the payment gateway 809 to send information on the SMS short code and transaction details for the service (at 1013). Accordingly, the payment gateway 809 generates a unique transaction ID and sends the ID and the associated SMS short code to the NFC application 803 (at 1015). The NFC application 803 initiates payment for the service by initiating an SMS message containing the transaction ID addressed to the SMS short code corresponding to the operator billing system 813 (at 1017). The SMS is forwarded to the operator billing system 813 via the operator access point 811 (at 1019).

After receiving the SMS message, the operator billing system 813 forwards the message along with the MSISDN number corresponding to the consumer device 801 to the payment gateway 809 (at 1021). The payment gateway 809 matches the transaction ID sent to the client at 829 with the transaction ID received from the operator billing system 813, and initiates a premium rate SMS (PSMS) message to the operator billing system 813 (at 1023). The payment gateway 807 also sends confirmation of the billing charge to the NFC application 803 (at 1025) and confirmation to the store front 807 to deliver any digital goods associated with the service (at 1027).

The store front determines that the application associated with the service is already installed on the consumer device 801 and sends the application activation code to the device 801 (at 1029). The activation code may be automatically passed to the NFC application 803 by the store front 807 or it may be manually entered by the consumer when prompted (at 1031).

FIGS. 11A and 11B are time sequence diagrams that illustrate a sequence of messages and processes for management a service including an application that requires subscription to another feature, according to various exemplary embodiments. At 1101, a consumer device 801 is tapped on the NFC tag 805 to activate a service. In response, the NFC application 803 negotiates with the NFC tag 805 (at 1103) to request the service information from the NFC tag 805 (at 1105). The NFC application 803 then reads and decrypts the service information from the NFC tag 805 (at 1107).

In this example, the service information includes an activation code for a service and a promotion code to apply towards the service billing charge. At 1109, the NFC application 803 reads the service information and interprets it as an activation code and a promotion code, and sends the service information to the store front 807 via an SMS message.

On receipt of the message, the store front 807 interprets the service information as a service activation code for a service and sends a confirmation request to the consumer device 801 (at 1111). The confirmation message, for instance, contains the billing price for the service taking into account the promotion code. In addition, the confirmation message identifies any features that are required as part of the service. For example, an e-mail service requires subscription to a data plan. If the consumer device 801 does not already have the feature (e.g., data plan) already configured, the store front 807 includes the feature and associated billing information in the confirmation message.

Upon confirmation from the user to activate the service (and any additional features if applicable) and to apply the charges to the user's phone bill, the NFC application 803 sends a request to the payment gateway 809 to send information on the SMS short code and transaction details for the service (at 1113). Accordingly, the payment gateway 809 generates a unique transaction ID and sends the ID and the associated SMS short code to the NFC application 803 (at 1115). The NFC application 803 initiates payment for the service by initiating an SMS message containing the transaction ID addressed to the SMS short code corresponding to the operator billing system 813 (at 1117). The SMS is forwarded to the operator billing system 813 via the operator access point 811 (at 1119).

After receiving the SMS message, the operator billing system 813 forwards the message along with the MSISDN number corresponding to the consumer device 801 to the payment gateway 809 (at 1121). The payment gateway 809 matches the transaction ID sent to the client at 829 with the transaction ID received from the operator billing system 813, and initiates a premium rate SMS (PSMS) message to the operator billing system 813 (at 1123). The payment gateway 807 also sends confirmation of the billing charge to the NFC application 803 (at 1125) and confirmation to the store front 807 to deliver any digital goods associated with the service (at 1127).

If applicable, the store front 807 initiates download of any application or other digital content to the consumer device 801. The store front 807 also initiates subscription to any feature (e.g., data plan) require as part of the service (at 1129). The downloaded application 845 is activated using the activation code read from the NFC tag 805. The activation code may also be automatically passed to the NFC application 803 by the store front 807 or it may be manually entered by the consumer when prompted (at 1131).

The processes described herein for managing services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
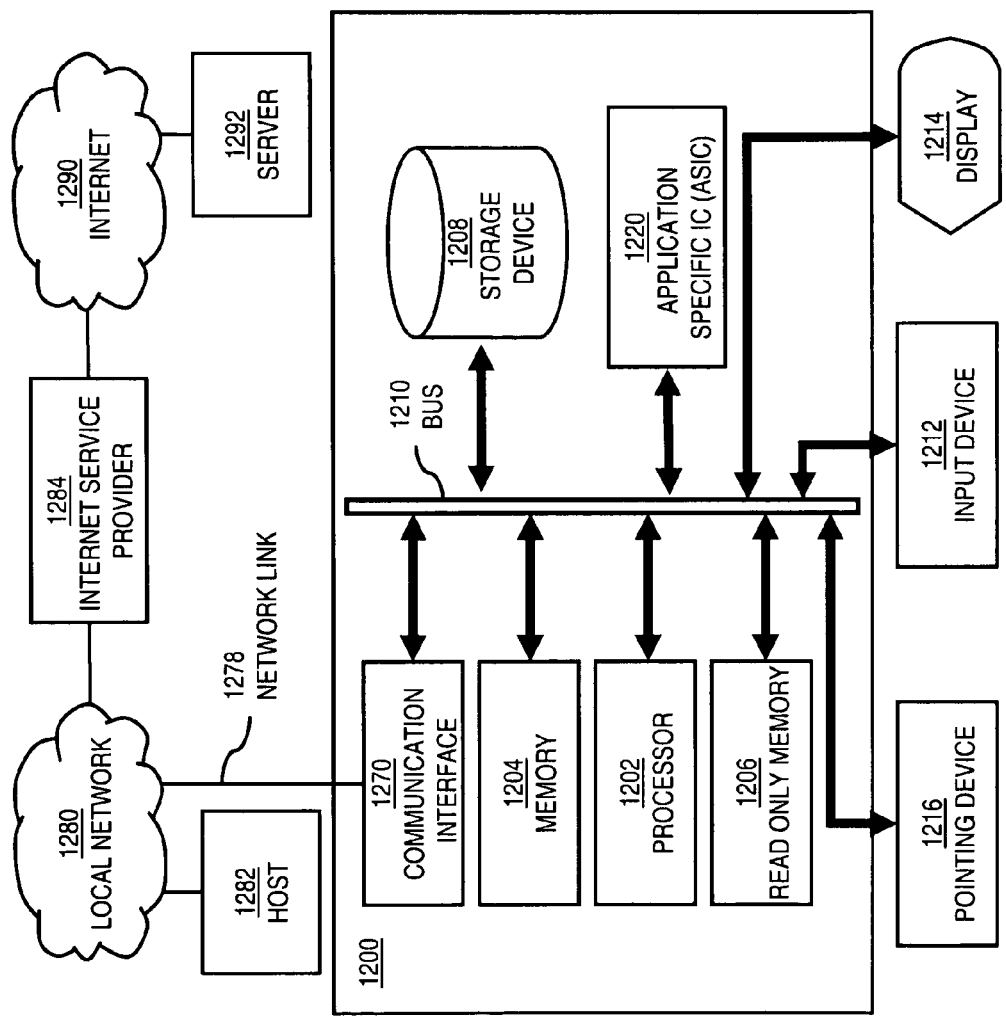
FIG. 12 is a diagram of hardware that can be used to implement an embodiment of the invention.

FIG. 12 illustrates a computer system 1200 upon which an embodiment of the invention may be implemented. Computer system 1200 is programmed to carry out the inventive functions described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information. The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 13:
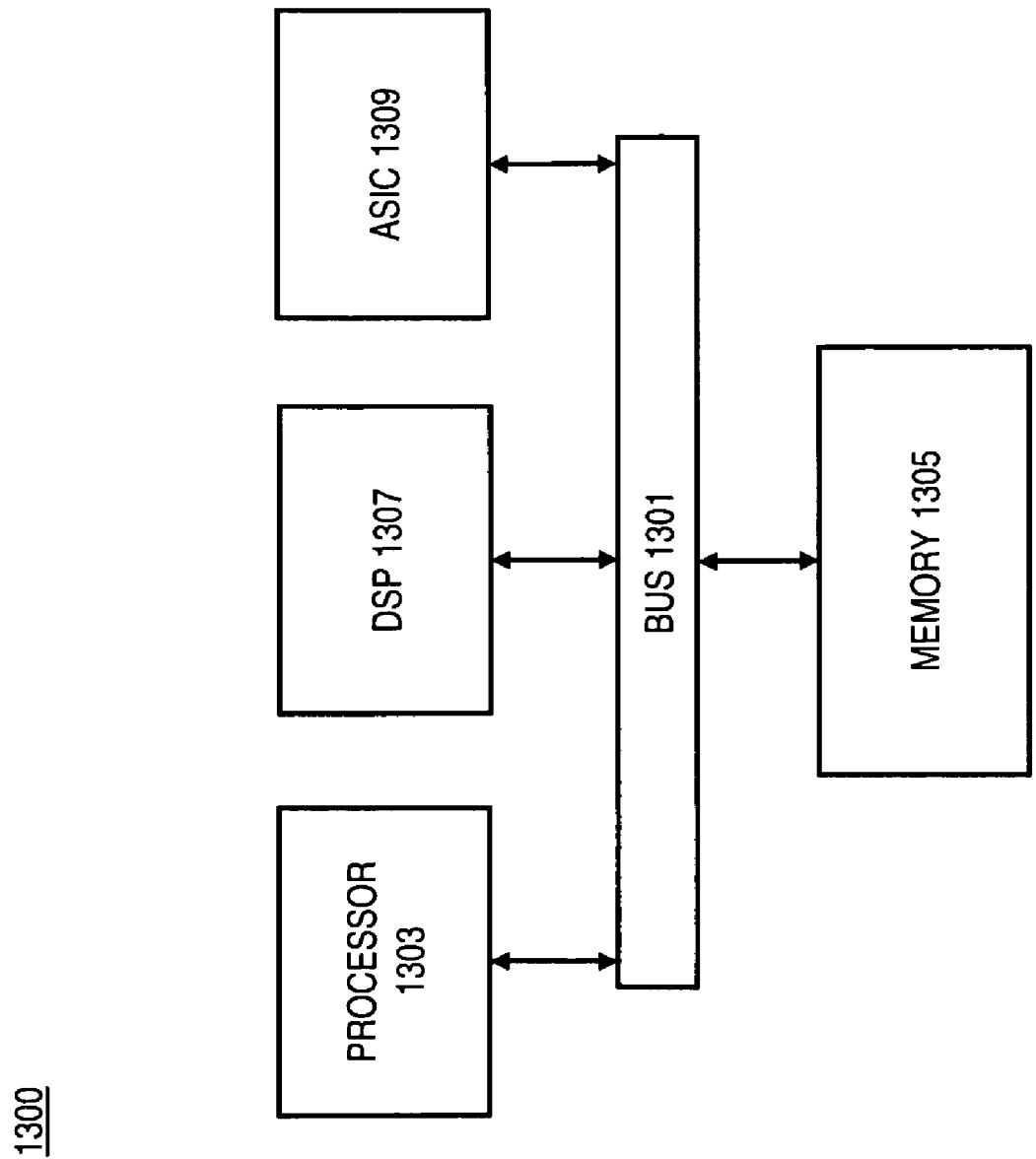
FIG. 13 is a diagram of a chip set that can be used to implement an embodiment of the invention.

FIG. 13 illustrates a chip set 1300 upon which an embodiment of the invention may be implemented. Chip set 1300 is programmed to carry out the inventive functions described herein and includes, for instance, the processor and memory components described with respect to FIG. 12 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-word signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein. The memory 1305 also stores the data associated with or generated by the execution of the inventive steps.

Figure 14:
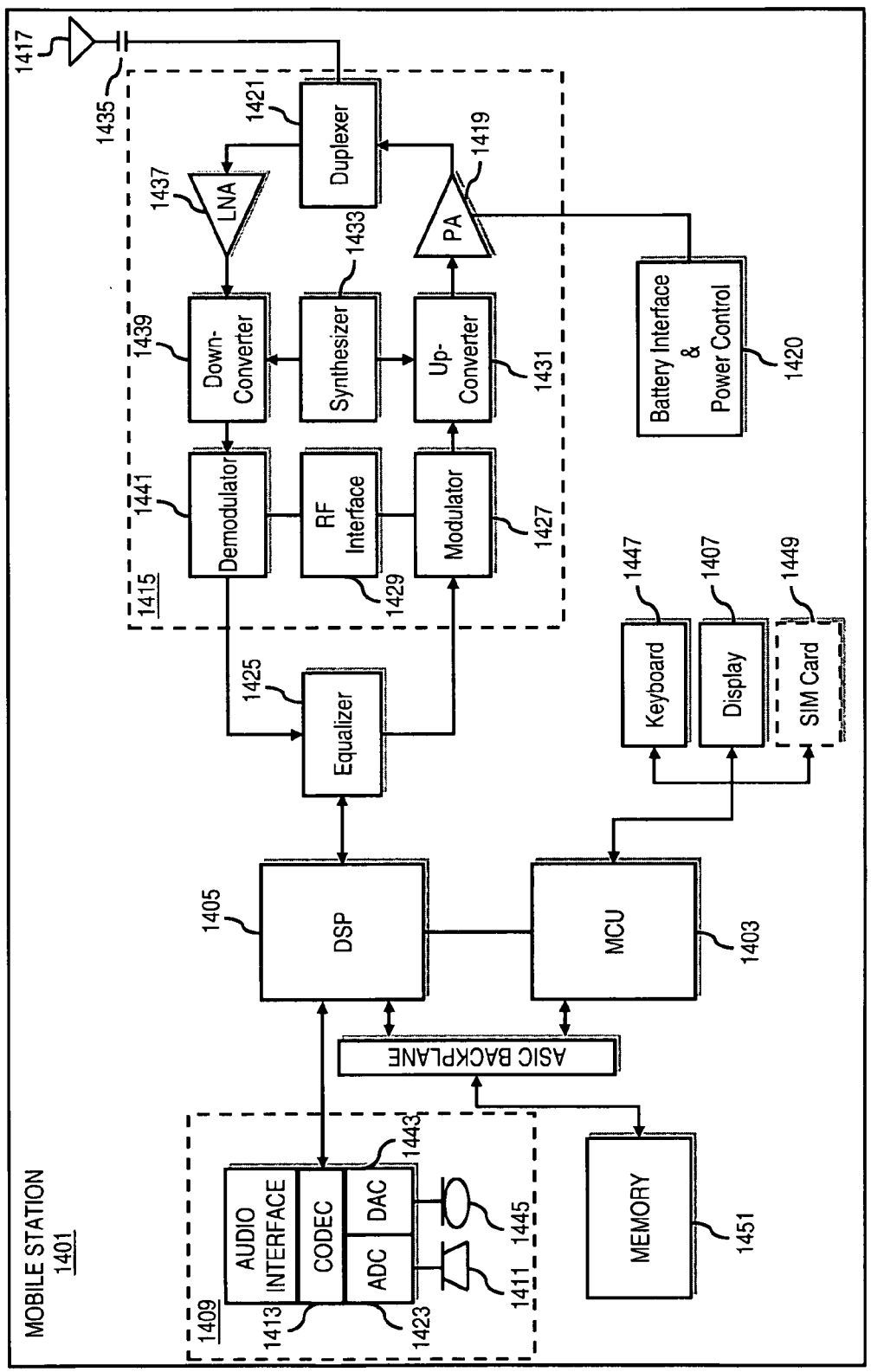
FIG. 14 is a diagram of a mobile station (e.g., handset) that can be used to implement an embodiment of the invention.

FIG. 14 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403-which can be implemented as a Central Processing Unit (CPU) (not shown).

The MCU 1403 receives various signals including input signals from the keyboard 1447. The MCU 1403 delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium carrying one or more sequences of one or more instructions which, when executed by one or more processors, cause the one or more processors to at least perform the following:
   detecting a tap of a user equipment on or near a bearer tag;
   initiating determination of service information, related to one or more services, from the bearer tag;
   generating one or more service management requests to manage the one or more services according to the service information; and
   initiating transmission of the one or more service management requests to a services platform for management of the one or more services according to a billing arrangement, wherein managing the one or more services comprises activating, modifying, discovering, accessing, or setting up the one or more services, and the management of the one or more services comprises activation, modification, discovery, accessing, and setting up of the one or more services.

2. A non-transitory computer readable storage medium of claim 1, wherein the bearer tag is a near field communication (NFC) tag, radio frequency identification (RFID) tag, barcode, contactless card, or a combination thereof.

3. A non-transitory computer readable storage medium of claim 1, wherein the billing arrangement is a predetermined billing arrangement or a recurring billing arrangement.

4. A non-transitory computer readable storage medium of claim 1, wherein the tap causes the one or more processors to initiate the determination of the service information.

5. A non-transitory computer readable storage medium of claim 1, wherein the one or more processors are further caused to perform the following:
   receiving a confirmation request from the services platform for management of the one or more services, the confirmation request including billing information related to the one or more services;
   detecting another input from the user for responding to the confirmation request;
   generating a message based on the input; and
   initiating transmission of the message to the services platform.

6. An apparatus comprising a processor and a memory storing executable instructions that if executed cause the apparatus to at least perform the following:
   detect a tap of a user equipment on or near a bearer tag;
   initiate determination of service information, related to the one or more services, from the bearer tag;
   generate one or more service management requests to manage the one or more services according to the service information; and
   initiate transmission of the one or more service management requests to a services platform for management of the one or more services according to a billing arrangement,
   wherein managing the one or more services comprises activating, modifying, discovering, accessing, or setting up the one or more services, and the management of the one or more services comprises activation, modification, discovery, accessing, and setting up of the one or more services.

7. An apparatus of claim 6, wherein the bearer tag is a near field communication (NFC) tag, radio frequency identification (RFID) tag, barcode, contactless card, or a combination thereof.

8. An apparatus of claim 6, wherein the billing arrangement is a predetermined billing arrangement or a recurring billing arrangement.

9. An apparatus of claim 6, wherein the tap causing the processor and the memory to initiate the determination of the service information.

10. An apparatus of claim 6, wherein the processor and the memory are further configured to receive a confirmation request from the services platform for management of the service, to detect another input from the user for responding to the confirmation request, to generate a message based on the input, and to initiate transmission of the message to the services platform.

11. An apparatus of claim 6, wherein the apparatus is a mobile phone further comprising:
   user interface circuitry and user interface software configured to facilitate user control of at least some functions of the mobile phone through use of a display and configured to respond to user input; and
   a display and display circuitry configured to display at least a portion of a user interface of the mobile phone, the display and display circuitry configured to facilitate user control of at least some functions of the mobile phone.

12. An apparatus of claim 11, wherein the mobile phone further comprises:
   a bearer tag reader and bearer tag reader circuitry configured to read service information from a near field communication (NFC) tag, a radio frequency identification (RFID) tag, a barcode, a contactless card, or a combination thereof.

13. An apparatus of claim 6, wherein the apparatus is part of a communication system further comprising:
   user equipment configured to facilitate user access to a communication network; and
   a communication network configured to facilitate user connectivity to one or more other user equipment or one or more computer systems, the one or more user equipment or the one or more computer systems configured to access the communication network.

14. An apparatus of claim 13, wherein the communication system further comprises:
   a services platform configured to provide the one or more services corresponding to the service information of the bearer tag; and
   a network billing system configured to provide billing information related to the one or more services corresponding to the service information of the bearer tag.

15. A non-transitory computer-readable storage medium carrying one or more sequences of one or more instructions which, when executed by one or more processors, cause the one or more processors to at least perform the following:
   receiving a service management request from a user to manage one or more services corresponding to a bearer tag;
   validating the service management request to manage the one or more services against one or more service restrictions;
   determining billing information for the one or more services;
   generating a message requesting confirmation to manage the one or more services, the message including billing information related to the one or more services;
   initiating transmission of the message to the user;
   receiving a response message from the user; and
   initiating management of the one or more services according to the response message.

16. A non-transitory computer-readable storage medium of claim 15, wherein the bearer tag is a near field communication (NFC) tag, radio frequency identification (RFID) tag, barcode, contactless card, or a combination thereof.

17. A non-transitory computer readable storage medium of claim 15,
   wherein the one or more service restrictions include a location restriction, a date restriction, a prior-use restriction, a restriction on the number of uses, or a combination thereof.

* * * * *